(12) United States Patent
Zafar et al.

(10) Patent No.: US 10,062,160 B2
(45) Date of Patent: Aug. 28, 2018

(54) PATTERN WEAKNESS AND STRENGTH DETECTION AND TRACKING DURING A SEMICONDUCTOR DEVICE FABRICATION PROCESS

(71) Applicant: Anchor Semiconductor Inc., Santa Clara, CA (US)

(72) Inventors: Khurram Zafar, San Jose, CA (US); Chenmin Hu, Saratoga, CA (US); Ye Chen, San Jose, CA (US); Yue Ma, San Jose, CA (US); Chingyun Hsiang, Cupertino, CA (US); Justin Chen, Milpitas, CA (US); Raymond Xu, Sunnyvale, CA (US); Abhishek Vikram, Santa Clara, CA (US); Ping Zhang, Saratoga, CA (US)

(73) Assignee: Anchor Semiconductor Inc., Santa Clara, CA (US)

(*) Notice: Subject to any disclaimer, the term of this patent is extended or adjusted under 35 U.S.C. 154(b) by 0 days.

(21) Appl. No.: 15/709,856

(22) Filed: Sep. 20, 2017

(65) Prior Publication Data

US 2018/0033132 A1  Feb. 1, 2018

Related U.S. Application Data

(63) Continuation of application No. 15/066,280, filed on Mar. 10, 2016, now Pat. No. 9,846,934.

(Continued)

(51) Int. Cl.
*G06K 9/00* (2006.01)
*G06T 7/00* (2017.01)
(Continued)

(52) U.S. Cl.
CPC ............ *G06T 7/001* (2013.01); *G06K 9/4604* (2013.01); *G06K 9/4671* (2013.01); *G06K 9/52* (2013.01);
(Continued)

(58) Field of Classification Search
CPC ........... H01L 29/02; G06T 2207/30141; G06T 2207/10056; G06T 2207/30148
(Continued)

(56) References Cited

U.S. PATENT DOCUMENTS

| 6,011,619 A | 1/2000 | Steffan |
| 6,067,163 A * | 5/2000 | Guldi ...................... H01L 22/12 257/E21.53 |

(Continued)

FOREIGN PATENT DOCUMENTS

| CN | 1734744 A | 2/2006 |
| CN | 102856214 A | 1/2013 |

(Continued)

OTHER PUBLICATIONS

Guo et al., "Enhanced photomask quality control by 2D structures monitoring using auto image-to-layout method on advanced 28nm technology node or beyond", Apr. 10, 2013.

(Continued)

*Primary Examiner* — Yosef Kassa
(74) *Attorney, Agent, or Firm* — Van Pelt, Yi & James LLP

(57) ABSTRACT

Tracking patterns during a semiconductor fabrication process includes: obtaining an image of a portion of a fabricated device; extracting contours of the portion of the fabricated device from the obtained image; aligning the extracted contour to a matching section of a reference design; decomposing the matching section of the reference design into one or more patterns; and updating a pattern tracking database (Continued)

with information pertaining to at least one pattern in the one or more patterns generated as a result of the decomposition.

30 Claims, 16 Drawing Sheets

Related U.S. Application Data

(60) Provisional application No. 62/146,572, filed on Apr. 13, 2015.

(51) Int. Cl.
  *G06K 9/46* (2006.01)
  *G06K 9/62* (2006.01)
  *G06K 9/52* (2006.01)

(52) U.S. Cl.
  CPC ... *G06K 9/6201* (2013.01); *G06K 2009/4666* (2013.01); *G06T 2207/20081* (2013.01); *G06T 2207/30148* (2013.01)

(58) Field of Classification Search
  USPC ....... 382/141, 145, 147, 149, 170, 171, 282, 382/291; 348/86, 125, 126
  See application file for complete search history.

(56) References Cited

U.S. PATENT DOCUMENTS

| | | | |
|---|---|---|---|
| 6,539,106 B1 | 3/2003 | Gallarda | |
| 6,630,711 B2 * | 10/2003 | Huang | H01L 29/41716 257/329 |
| 6,667,806 B2 | 12/2003 | Yoshitake | |
| 6,750,974 B2 * | 6/2004 | Svetkoff | G01B 11/2518 250/234 |
| 7,142,708 B2 | 11/2006 | Sakai | |
| 7,312,449 B2 * | 12/2007 | Nakasuji | G01N 23/04 250/310 |
| 7,485,858 B1 | 2/2009 | Obara | |
| 7,611,358 B2 | 11/2009 | Cox | |
| 7,684,611 B2 | 3/2010 | Simpkins | |
| 7,706,599 B2 | 4/2010 | Sim | |
| 7,707,542 B1 * | 4/2010 | Gennari | G06F 17/5068 430/5 |
| 7,752,584 B2 * | 7/2010 | Yang | G06F 17/5081 430/30 |
| 7,818,707 B1 * | 10/2010 | Gennari | G06F 17/5068 716/104 |
| 8,041,451 B2 | 10/2011 | Wu | |
| 8,077,962 B2 | 12/2011 | Toyoda | |
| 8,079,005 B2 * | 12/2011 | Lai | G06F 17/5081 716/111 |
| 8,309,919 B2 | 11/2012 | Obara | |
| 8,312,401 B2 | 11/2012 | Leu | |
| 8,515,155 B2 * | 8/2013 | Toyoda | G06K 9/6255 382/145 |
| 8,631,373 B1 * | 1/2014 | Gennari | G06F 17/5068 716/118 |
| 8,832,621 B1 * | 9/2014 | Gennari | G06F 17/50 716/112 |
| 9,355,208 B2 | 5/2016 | Shifrin | |
| 2012/0185818 A1 | 7/2012 | Leu | |
| 2013/0066454 A1 | 3/2013 | Geshel | |
| 2014/0212022 A1 | 7/2014 | Geshel | |
| 2014/0343884 A1 | 11/2014 | Leu | |
| 2016/0005157 A1 | 1/2016 | Toyoda | |
| 2017/0212168 A1 | 7/2017 | Leu | |

FOREIGN PATENT DOCUMENTS

| | | |
|---|---|---|
| TW | 201401231 A | 1/2014 |
| TW | 201407127 A | 2/2014 |
| TW | 201439986 A | 10/2014 |
| TW | 201510514 A | 3/2015 |
| TW | 201511154 A | 3/2015 |

OTHER PUBLICATIONS

Guo et al., "Simulation Based Mask Defect Printability Verification and Disposition, Part II", Photomask Technology 2011, Oct. 14, 2011.

Zhu et al., "Automatically High Accurate and Efficient Photomask Defects Management Solution for Advanced Lithography Manufacture", Apr. 2, 2014.

* cited by examiner

| | Summary Data Analysis | | | |
|---|---|---|---|---|
| | Overall Fidelity Score | Std. Deviation | Frequency | Other Metrics |
| RP1 | ###.## | ###.## | ###.## | ###.## |
| RP2 | ###.## | ###.## | ###.## | ###.## |
| RP3 | ###.## | ###.## | ###.## | ###.## |
| RP3 | ###.## | ###.## | ###.## | ###.## |
| ⋮ | ⋮ | ⋮ | ⋮ | ⋮ |
| ⋮ | ⋮ | ⋮ | ⋮ | ⋮ |
| RPn | ###.## | ###.## | ###.## | ###.## |

PATTERN WEAKNESS AND STRENGTH DETECTION AND TRACKING DURING A SEMICONDUCTOR DEVICE FABRICATION PROCESS

CROSS REFERENCE TO OTHER APPLICATIONS

This application is a continuation of co-pending U.S. patent application Ser. No. 15/066,280, entitled PATTERN WEAKNESS AND STRENGTH DETECTION AND TRACKING DURING A SEMICONDUCTOR DEVICE FABRICATION PROCESS filed Mar. 10, 2016 which is incorporated herein by reference for all purposes, which claims priority to U.S. Provisional Application No. 62/146,572, entitled PATTERN WEAKNESS AND STRENGTH DETECTION AND TRACKING DURING A SEMICONDUCTOR DEVICE FABRICATION PROCESS filed Apr. 13, 2015 which is incorporated herein by reference for all purposes.

BACKGROUND OF THE INVENTION

During the semiconductor device fabrication process, high speed, low resolution wafer inspections (e.g., Bright Field, Dark Field, etc.) are performed on selected wafers from a fabrication lot. Generally, these inspections report a number of defects on the wafers within the lot. Out of the reported detects, a small subset (e.g., a sub-sample) of the defects are selected for review and defect-type classification. Classification can be done by capturing a high-resolution image of each sampled defect, examining the image to determine the type of defect present, then assigning an appropriate classification code to the defect. High-resolution images of wafer defects can be captured using techniques such as scanning electron microscopy (Defect-Review SEM tools), electron-beam scanning (E-Beam tools), etc. of areas of one or more die on certain wafers. The captured images can then be selectively reviewed to classify the type of defect present in those images.

Additionally, relatively large portions of one or more die on selected wafers can be directly imaged in high resolution using techniques such as electron-beam scanning (E-Beam), without first resorting to a low resolution (high speed) inspection process (e.g. Bright Field or Dark Field). Although considerably slower than low resolution inspection systems, this produces a set of high resolution image files, possibly covering a larger area than Review SEM images.

Existing image review and classification methods are designed to classify a defect that occupies a small subarea of the image. Due to the diversity of features in an image and the large volume of images being generated, it can be challenging to evaluate and examine anomalies that may be present.

BRIEF DESCRIPTION OF THE DRAWINGS

Various embodiments of the invention are disclosed in the following detailed description and the accompanying drawings.

FIG. 9 illustrates an example embodiment of a table describing some of the statistical summary data of each reference pattern.

DETAILED DESCRIPTION

Figure 1:
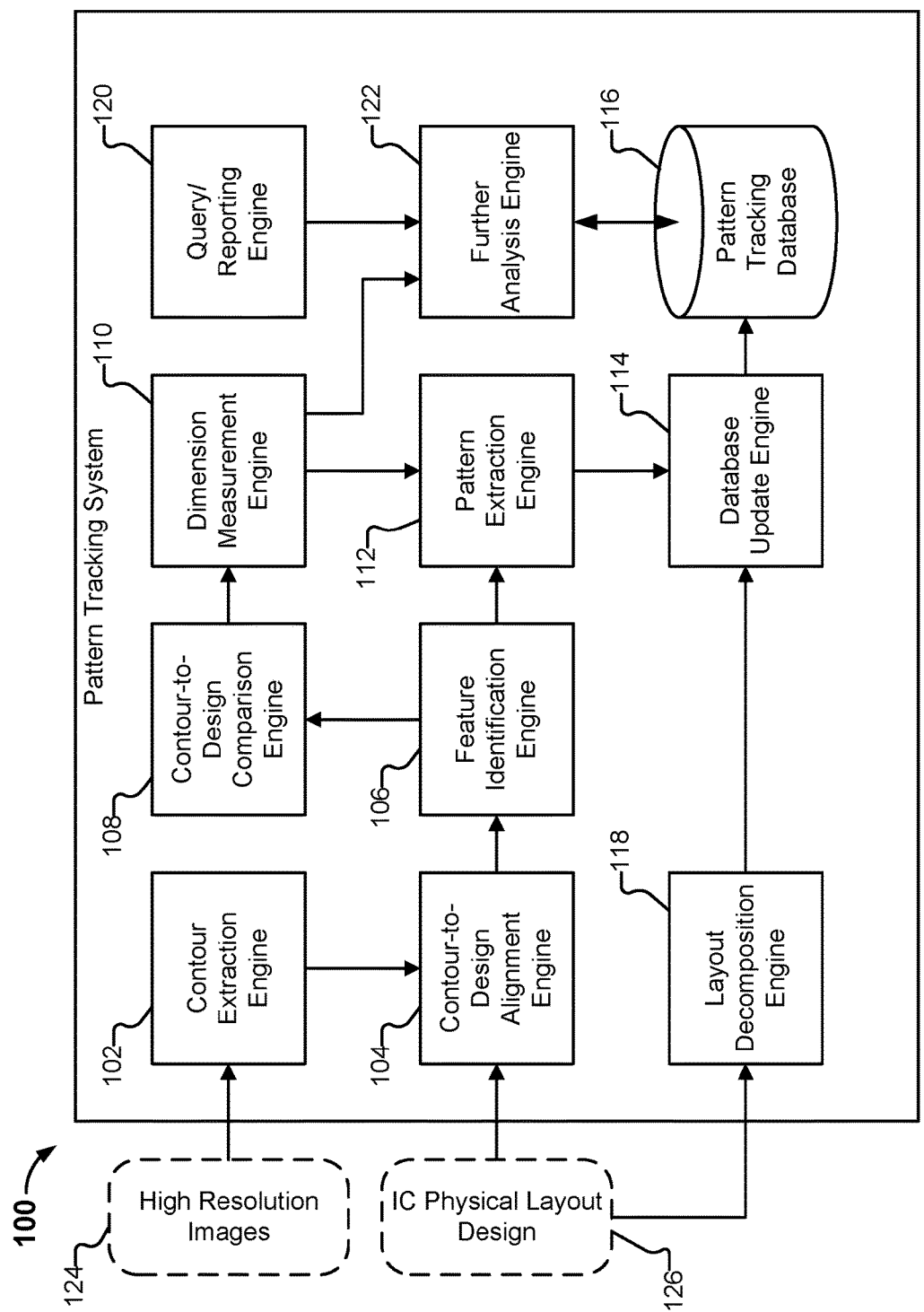
FIG. 1 is a block diagram illustrating an embodiment of a system for pattern weakness and strength detection and tracking during a semiconductor fabrication process.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of the techniques disclosed herein relate generally to the field of semiconductor device fabrication, which can be carried out in a Wafer Fabrication plant or simply a 'fab.' More particularly, embodiments of the techniques described herein relate to the detection, monitoring, and tracking of weak and strong design or layout patterns on semiconductor wafers during a semiconductor device fabrication process.

Described herein are computational techniques that can be used to detect, track, and monitor subtle to significant anomalies that may arise during the fabrication process of a semiconductor device. Such computational techniques are also able to determine and report the strength or weakness of a design or layout pattern etched or printed on the wafer during a fabrication process.

The techniques described herein can be used to address challenges relating to detecting, monitoring, and tracking physical design or layout patterns on wafers in semiconductor device fabrication. Instead of using simulations to predict weaknesses in printed patterns, the techniques disclosed herein, in one or more embodiments, use an empirical or data driven approach. The techniques disclosed herein, in one or more embodiments, operate within the product die on actual device circuits, although the techniques can also be used to operate on "scribe line" test structures (where scribe line test structures are specialized patterns that are fabricated in the gaps that exist between the actual product die on a wafer surface). Compared to existing/conventional techniques, the techniques described herein provide an improved and more reliable assessment of the quality of a physical layout or the physical design of a semiconductor device and the accompanying fabrication processes (such as photolithography and etch processing steps). In some embodiments, the ability to track patterns entails the use of a Pattern Tracking Database that contains all pertinent information about the layout patterns to be tracked. Techniques related to construction and content of the Pattern Tracking Database are disclosed herein.

As is well understood in the art, a semiconductor device, also referred to as an integrated circuit, is fabricated on a semiconductor wafer using a semiconductor fabrication process. A physical layout file describes the physical design or the physical layout of the semiconductor device. As used herein, the terms "physical design" and "physical layout" are used interchangeably to refer to the arrangement of structures to be formed on a semiconductor wafer to create the functional circuits of the semiconductor device. More specifically, the physical layout file defines the patterns of one or more regions or layers to be formed in and/or on the semiconductor wafer during the fabrication process to form the desired functional circuits of the semiconductor device. The physical design or layout of a semiconductor device is printed on the semiconductor wafer in a repeated array, forming a two dimensional array of dies, or "product dies", each die containing the functional circuits of the semiconductor device. The wafer may include scribe line test structures formed between the product dies. At the completion of the fabrication process, the wafer is cut to separate the dies. The pieces of separated dies are sometimes referred to as semiconductor chips and are packaged to form the integrated circuit or semiconductor device.

During a semiconductor device fabrication process, using suitable wafer inspection equipment, defects (or significant errors) can be detected on the wafers being processed. These defects can represent a significant deviation of the printed pattern, as seen in the high-resolution images of the defects, from the reference or intended design, as seen in the original blueprint of the device (also referred to as the physical layout file). These defects can arise during any of the myriad steps in the fabrication process and can indicate a weak pattern. As used herein, a pattern refers to a physical layout pattern or a physical design pattern of a semiconductor device. In embodiments of the present invention, a pattern includes one or more features that are extracted either by pre-processing the physical layout file of a semiconductor device or by evaluating a portion of the physical layout file matching to a high resolution image of at least a part of the die on a wafer during the fabrication process. In embodiments of the present invention, a feature refers to a line or polygon shape in the image, exclusive of the background of the image, where the shape represents at least a part of an electronic circuit. For example, and without limitation, a feature may represent part of a transistor, a capacitor, a resistor, an electronic interconnect, a logic gate, and other circuits, or a combination thereof. A feature can also be defined by the spacing between lines or polygon shapes. In conventional fabrication processes, subtle variations in the printed pattern are neither detected nor tracked by wafer inspection equipment. Additionally, "consequential" and "critical" features are typically not monitored by conventional inspection tools. As one example, critical features include those features that have a propensity to impact yield with a high probability. An example of a consequential feature is one for which tracking and monitoring is desired. For example, suppose that a feature's impact on yield is unknown. Using the techniques described herein, such features can be tracked to determine their yield impact.

As described herein, a weak pattern is a design pattern that, when printed onto a wafer during the fabrication process, has a relatively higher probability of resulting in a feature that is sufficiently divergent (or dissimilar) from the intended pattern specified in the physical layout file. Conversely, a strong pattern is a design pattern that, when printed onto a wafer during the fabrication process, has a relatively higher probability of resulting in a feature that is sufficiently similar (or approximate) to the intended pattern specified in the physical layout file. The strength or weakness of a pattern is influenced by both the geometric properties of the pattern (i.e., line widths, line spaces, pattern complexity, etc.) and the manner in which those properties interact with the fabrication processes (i.e., photolithography, etch, chemical mechanical planarization, etc.) that attempt to render the pattern onto the surface of the semiconductor wafer. Thus, each pattern can be classified as a strong pattern, a weak pattern, or a variant thereof, depending on the geometric properties and the manner in which those properties interact with the fabrication process. Further, other factors such as the process or photomask used during fabrication can also affect the strength of a given pattern.

As will be described in further detail below, the techniques described herein utilize empirical data of each device during its fabrication, in various embodiments, to perform analysis to identify weak and strong patterns, to track subtle variations in the printed pattern (soft errors), to monitor consequential and critical features, and assist in subsequent characterization of any anomalies thus detected. Such analysis can be performed on actual pattern(s) contained within actual product die, as well as on test structures fabricated into the scribe lines (or gaps) that exist between die. As will be described in further detail below, when high resolution images are analyzed by the system and method of the present invention, all pertinent information about hard defects (significant errors), soft defects (subtle variations), and consequential and critical patterns is inserted and maintained within a pattern tracking database. In various embodiments, the pertinent information stored in the pattern tracking database includes, but is not limited to, extracted contours; corresponding design clips from the physical layout file of the integrated circuit being fabricated; the lot, wafer, and die IDs; the coordinates of the reported defects; the date and time of the inspections; the manufacturing step at which the inspection was done; fidelity scores or any other metrics, as appropriate. In some embodiments, a fidelity score is a value that is indicative of how a printed feature/pattern matches/compares to its intended design (as defined, for example, by a physical layout blueprint). In other words, a fidelity score is indicative of how well the actual printed pattern on a wafer compares to the intended physical layout design.

In some embodiments, the pattern tracking database includes a set of unique reference patterns that are present in a given physical layout file defining the physical design of an integrated circuit. In one embodiment, the reference patterns are extracted by pre-processing the physical layout file for the integrated circuit. In another embodiment, the reference patterns are extracted from sections of the physical layout file determined to match to high-resolution images taken from wafers being fabricated.

FIG. 1 is a block diagram illustrating an embodiment of a system for pattern weakness and strength detection and tracking during a semiconductor fabrication process. In the example shown, system 100 includes contour extraction engine 102, contour-to-design alignment engine 104, feature identification engine 106, contour-to-design comparison engine 108, dimension measurement engine 110, pattern extraction engine 112, database update engine 114, pattern tracking database 116, layout decomposition engine 118, further analysis engine 120, and query/reporting engine 122.

Contour extraction engine 102 is configured to analyze high resolution images (124) which are taken of portions of one or more wafers during the fabrication process of an integrated circuit. Contour extraction engine 102 performs contour extraction of features from the high resolution images. In some embodiments, contour extraction is an image processing operation performed to segment an image to extract a set of (closed) regions with similar properties, such as light intensity or texture. The segmented regions of the image are sometimes referred to as contours. In one embodiment, high-resolution images of test or production wafers are analyzed and compared with the physical layout file (e.g., Graphical Data System (GDS)/Open Artwork System Interchange Standard (OASIS) files). These image files can span large or small areas of the wafer. In one embodiment, the high resolution images are produced using E-Beam tools, SEM (scanning electron microscope) Defect Review tools, or any tool capable of producing images with sufficient resolution.

As one example, a bright field inspection tool is used to evaluate a wafer during fabrication (e.g., as production inventory is fabricated). The bright field tool is used to identify and report defects. In some embodiments, nuisance event filtering is used to filter out defects that are nuisance type. This reduces the population of defects to a smaller number of defects of interest (DOI). Within this smaller set of DOI, sampling, such as random sampling and diversity sampling, is performed. In some embodiments, diversity sampling evaluates the properties of each defect (e.g., as reported by the bright field tool), such as polarity, intensity, magnitude, energy, physical attributes (e.g., size) or any other attributes of each defect as appropriate. A diverse sample of the defects of interest across these attributes is taken, and high resolution images of the sampled defects are obtained. Other sample plans can be used, as appropriate.

The high resolution images taken of wafer defects can be processed using the techniques described herein to provide, for example, secondary die-to-database defect detection. While in the above example, the high resolution images are taken of defects, high resolution images of any sections of the wafer can be evaluated using the techniques described herein. That is, the high resolution images do not necessarily have to relate to or contain defects.

In some embodiments, performing contour extraction of features from a high-resolution image includes extracting one or more contours from the image by detecting printed patterns from the image and converting the detected patterns to polygonal representations. More specifically, a contour denotes the boundary of a feature in the image, where the feature is a distinct element of the image, exclusive of the background. The phrase 'contour extraction' refers, generally, to the extraction of the boundaries of all features in an image. The result is therefore a set of boundaries that collectively represent all of the features in the image. A contour can be extracted from an image using conventional image processing techniques, such as edge detection. Each extracted contour corresponds to a portion of the layout pattern being formed on the wafer using the physical layout file of the integrated circuit. In one embodiment, any textual or graphical annotation added to the high resolution image (e.g., by the image capturing tool) can be removed before the contours from the high resolution image are extracted. Removing annotations reduces or eliminates contour extraction errors, allowing the extracted contours to be properly matched to a reference pattern contained in the physical layout file of the semiconductor device (e.g., GDS/OASIS files).

Contour-to-design alignment engine 104 is configured to align or match the contour extracted from the high-resolution image to the reference design specified by the physical layout file (126). Alignment of the contour to the reference design is performed to identify a portion of the reference design—referred to as a "design clip"—that matches the extracted contours of the high resolution image.

The following is an example embodiment of performing contour-to-design alignment. Coordinates (e.g., X-Y, latitude/longitude coordinates, etc.) of the portion of the wafer captured in the high resolution image are obtained. For example, the coordinates are obtained from an inspection/imaging tool that generated the high resolution image. In some embodiments, stage errors, random errors, etc. in the coordinates are compensated for. For example, as described above, high resolution images may be taken for defects. The defect coordinates reported by an inspection tool may not be the true location of defects, due to, for example, measurement variation/error. In some cases, the inspection tools may specify maximum errors for defect locations (e.g., +/−120 nm).

Given the coordinates of the high resolution image (with inherent measurement variation/error), the corresponding location in the reference design is identified. The reference design refers to the physical layout file defining the physical layout pattern of the integrated circuit being manufactured. A search of the reference design within the vicinity of the coordinates is performed. In some examples, an area centered on the coordinates of the high resolution image, within a radius/area defined by the measurement error of the inspection tool that provided the coordinates can be searched. For example, the extracted contours of the high resolution image are moved around the X-Y coordinates of the design, until the contours of the image "snaps" onto a portion of the reference design. In some examples, a match or a best-fit can be used to match the image to the reference design. In this manner, the section of the reference design that matches to the portion of the wafer captured in the high resolution image is identified.

In one example embodiment, bitmaps are used to determine the section of a reference design that matches to the portion of the wafer that was captured in a high resolution image. For example, the reference design is rendered as a bitmap. The contours extracted from the high resolution image are also rendered as a bitmap. The bitmap of the contours of the high resolution image is compared against the rendered design bitmap to determine a best bitmap-to-bitmap fit. The portion of the reference design that matches best to the contours of the high resolution image is identified as the matching section of the design. In some embodiments, the high resolution image itself (which is also a bitmap) is compared against the rendered design bitmap to determine a best bitmap-to bitmap fit.

In another example embodiment, vectorization is used to determine the section of a reference design that matches the contours extracted for a portion of the wafer that was captured in the high resolution image. For example, the high resolution image is converted into one or more contours using the contour extraction method described above. Each contour extracted from the image is represented with a set of mathematical vectors (e.g., mathematical vectors along X and Y dimensions). The vectors of the contours are then compared with the mathematical vectors that are native to the reference design. The vectorized contours of the high resolution image are compared to the vectors of the reference design to determine a section of the reference design that is a best fit (i.e., matches) to the extracted contours of the portion of the wafer captured in the high resolution image.

Using one or more of the techniques described above, a section of the physical layout file matching the extracted contour from the high resolution image is identified. The matched section can then be extracted or "lifted" from the physical layout file. In embodiments of the present invention, the matched section represents the intended or reference pattern for the contour extracted from the high resolution image. As used herein, the matched section is also referred to as the lifted section or lifted design clip.

Feature identification engine 106 is configured to identify features of interest in the aligned/matched/lifted design clip of the physical layout file. In some embodiments, the lifted/matched reference design sections corresponding to high resolution images are searched for features of interest (e.g., consequential and critical features). Patterns can be composed of polygons of shapes of various types, with some pattern geometries having a greater propensity to impact yield. One example type of geometry that has a potential to impact yield is where the tip of a line is in proximity to the edge of another line (also referred to herein as a "tip-to-edge" or "t-shape" feature). While it may be intended in the reference design for there to be a clear gap between a tip and an edge, fabrication variation and inconsistencies may result in potential defects/errors in which the tip and edge are closer than what is intended. For example, if the tip and edge touch, this may result in a potential electrical short of two signal lines.

Various techniques can be used to search for the features of interest, including a rule-based pattern search engine, in which rules such as "minimum line width" or "minimum line space" or other consequential and critical features can be specified. In one embodiment, a feature of interest (e.g., critical and/or consequential feature) can be lines with small widths or small spacing between lines. For example, a rule can be implemented that identifies the existence of tip-to-edge features in the design clip/lifted section corresponding to the extracted contours of the high resolution image. The rules can apply to individual layers and/or combinations of layers. Another example of a rule is one that evaluates polysilicon (poly) lines that have contacts close to the end of the polysilicon line. For example, during fabrication, when poly lines are printed, pull back on the line may occur, where one or both ends of the line may be terminated prematurely, leading to a shortening of the line. If there is not sufficient distance between a contact and the end of the poly line in the design, there is the potential for a portion of a contact to be uncovered due to the pullback of the poly line. This may impede or completely obstruct the electrical connection between the contact and the poly line, leading to a malfunctioning transistor. The same can occur for vias that are formed between two interconnect layers.

The rules in the rule-based pattern search engine can be implemented or defined based on information gained from (computer-aided) simulations, information gained from empirical techniques such as 'focus exposure modulation' or FEM, information obtained from historical/previous fabrication performance, etc. In some embodiments, as new rules are added or implemented, design clips can be re-evaluated using the new rules to identify new features of interest.

Thus, features of interest (and their locations) can be identified in the lifted section of the reference design by performing a rule-based search. Multiple features of interest may be identified from the lifted section matching to a high resolution image.

Contour-to-design comparison engine 108 is configured to perform a comparison of each identified feature of interest in the lifted section of the reference design to the contours of the feature as extracted from the high resolution image, which is indicative of how the feature of interest was actually fabricated on the wafer. In some embodiments, the comparison is performed by comparing the contours of the identified feature of interest, extracted from the high resolution image, against the same feature of interest defined in the lifted design clip which represents the intended design of the feature. As one example, the intended values for dimensions of the feature of interest are determined from the matched design clip and then compared against the measured dimensions of the feature of interest, as actually fabricated. The dimensions can be measured from the contours of the feature of interest. For example, using the location of the feature of interest in the design clip (determined using the rule-based search), the corresponding location of the feature of interest in the extracted contours of the image can also be identified (because the contours have been aligned with the reference design). This allows the contours of the feature of interest, as fabricated, to be identified. Measurements of the contours at the identified location can then be taken. In some embodiments, a deviation or a difference, a comparison, a delta, or a variance, between the intended dimensions and actual measured dimensions is calculated. For example, an amount of deviation between the dimensions of the intended feature and the dimensions of a fabricated feature can be calculated. As will be described in further detail below, the determined deviation can be used to determine various types of metrics and perform various types of analysis, such as whether a defect or failure has occurred.

The intended dimensions of a feature and the dimensions of the feature, as printed, can be measured using dimension measurement engine 110. As one example, the dimensions intended for the feature can be obtained from an analysis of the geometry of the feature in the lifted section of the reference design. The actual dimensions for the printed/fabricated feature can be obtained by measuring the contours for the feature extracted from the obtained high resolution image. For example, suppose that the intended value for a tip-to-edge gap is 22 nm and the measured gap of the contour of the feature extracted from the high resolution image is 11 nm. The printed dimensions (11 nm) of the feature in the high resolution image can then be compared against the intended dimensions (22 nm) for the feature as defined by the reference design.

In some embodiments, a feature of interest (e.g., critical features such as lines with small widths or small spacing between lines) can be examined and assigned a fidelity score. In such an embodiment, as will be described in further detail below, the patterns to be inserted and tracked in the pattern tracking database may be lifted or extracted directly from the immediate neighborhood of these features. For these features, a variance between the extracted contour pattern and the reference pattern can be determined and used to calculate and assign a fidelity score. In another embodiment, the fidelity score can be calculated using any geometric property of the pattern as appropriate. In one embodiment, the fidelity score is a metric and determines the printability and stability of a given pattern in a given physical layout file.

Figure 7:
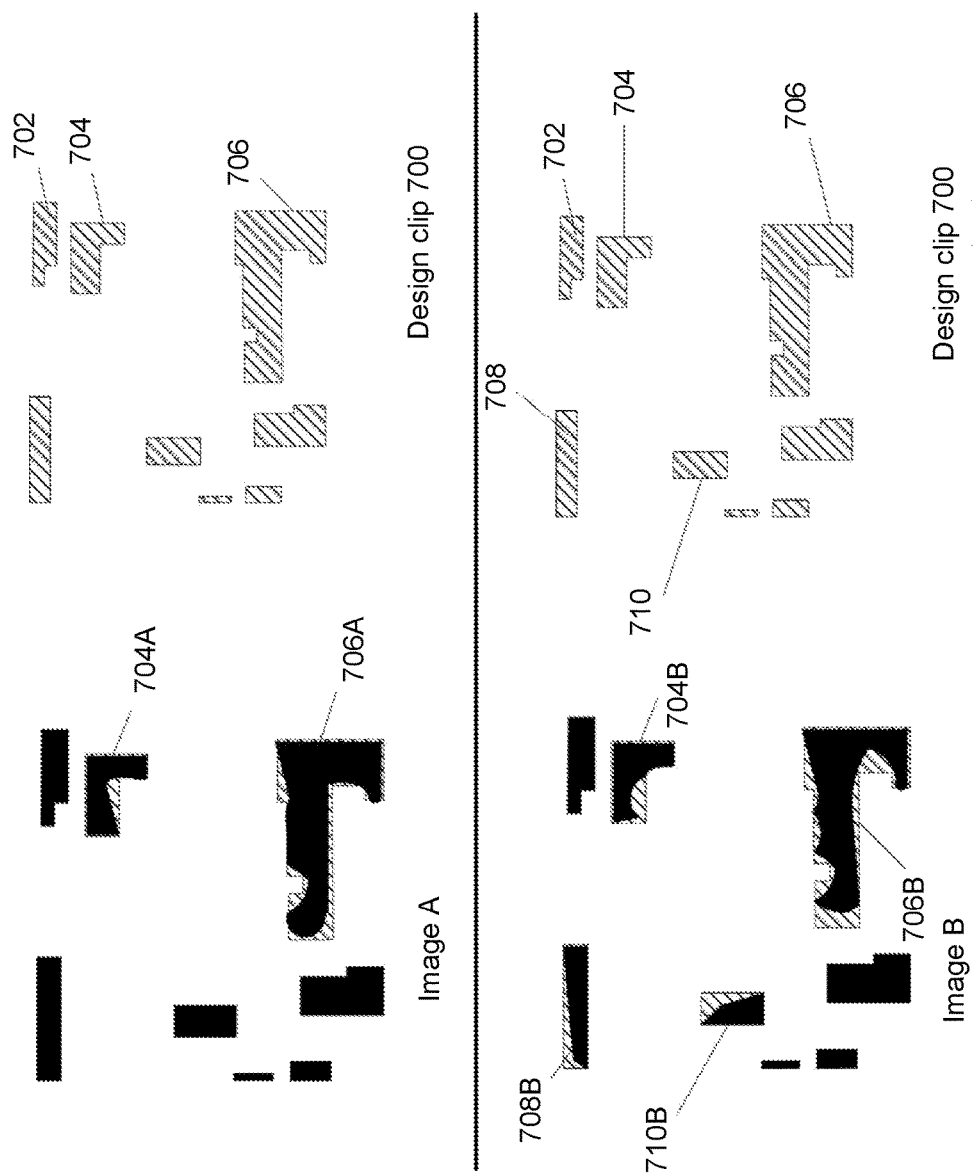
FIG. 7 illustrates a diagram describing an example embodiment of a comparison of the contours of lifted patterns to reference patterns to deduce the fidelity score of the contours.

An example embodiment of deducing a fidelity score for a reference pattern based on a comparison of the intended design of a feature included in the reference pattern and the contours of the feature, as printed, is described in conjunction with FIG. 7.

The fidelity score can be calculated as a difference between the printed and intended dimensions, as a percentage or proportion or fraction, or any other type of metric as appropriate. In the above tip-to-edge example, where the measured printed gap is 11 nm and the intended gap is 22 nm, a fidelity score of 50% (11 nm/22 nm*100%) can be calculated. In other words, for this empirical data point, this feature, as printed was 50% of its intended value. In some embodiments, the manner in which a fidelity score is determined is dependent on the type of feature for which the fidelity score is being computed (e.g., different types of features may be associated with different types/formats of fidelity scores). In some embodiments, fidelity scores are calculated at the time that measurements are made, or can be determined at a later time (e.g., at query time).

In some embodiments, feature analysis engine 120 performs defect detection and defect classification using the measurement data. The detection of whether there was a defect caused by the fabrication process can be determined by comparing the measurements of a fabricated feature to its intended dimensions. The type of defect that has occurred can also be classified. For example, if a tip-to-edge reference value was intended to be 20 nm, but the measured distance of an actual feature is 0 nm, then it can be determined that a hard-bridge defect occurred, and the feature is classified as such. If the fabricated value matches the intended value, then no defect has occurred.

In various embodiments, defect classification types include a hard-break, a hard bridge, any other type of hard defect as appropriate, line pull back, partial break, partial bridge, soft defect, etc. In some embodiments, the determination of whether a defect has occurred can be performed based on a comparison of actual measurement values and intended feature values as specified in the reference design.

In some embodiments, strength or weakness of a pattern during a semiconductor fabrication process can be detected and tracked using the techniques described herein. For example, as described above, the contours of printed patterns captured from a high resolution image can be extracted, where the contour patterns represent at least a part of an electronic circuit. The contours can then be matched to a reference design using a physical layout of the semiconductor device being fabricated. As will be described in further detail below, once the contours of the portion of the wafer captured in the high resolution image have been matched to a section of the reference design, the matched section can be decomposed into one or more patterns that can be tracked using the pattern tracking database 116, in embodiments of the present invention. From the lifted design clip associated with the contours extracted from the high resolution image, an extracted pattern (also referred to herein as an "extracted reference pattern," as it is a pattern extracted from a design clip that is a portion of the reference design or layout) surrounding a feature of interest may be identified or extracted from the lifted design clip. The extracted reference pattern is compared with existing reference pattern(s) (also referred to herein as "tracked reference patterns") in the pattern tracking database 116. If the extracted reference pattern matches a tracked reference pattern from the database, metrics for the newly extracted pattern can be calculated and added to the database as a new measurement data point for the tracked reference pattern. If the newly extracted pattern does not match an existing tracked reference pattern, the newly extracted pattern is inserted into the database as a new tracked reference pattern, and metrics for this extracted pattern can be calculated and added to the database as the first measurement data point. Over time, many new tracked reference patterns are added to the database, and many measurement data points are added for each of the tracked reference patterns. When any tracked reference pattern has accumulated a 'sufficient' number of measurement data points, statistical methods can be applied to determine the strength or weakness of that pattern.

In some embodiments, the calculation of fidelity scores, the determination or classification of defects using the measurement data, the determination of pattern strength or weakness, etc. is determined at the time that measurements are taken (e.g., at the time the high resolution images are processed). In other embodiments, the fidelity score calculation and defect detection or classification using the measurement data is performed at a later time (e.g., after the measurement data is stored to the pattern tracking database).

Pattern extraction engine 112 is configured to extract from the design clip a pattern of a specified radius centered on each identified feature of interest as an extracted reference pattern. An area of any appropriate shape/dimensions surrounding the feature of interest can be extracted (e.g., a square, rectangular, circular, or any other appropriate polygonal area). If multiple features of interest are identified from the high resolution image, then multiple corresponding extracted reference patterns will be extracted. As will be described in further detail below, each extracted reference pattern can be added to the pattern tracking database as a tracked reference pattern if the extracted reference pattern does not already exist in the database, such as by using database update engine 114. The pattern extraction operation results in the decomposition of a design clip corresponding to at least a part of a die captured in a high resolution image into a set of patterns as reference patterns that can be tracked.

In one example embodiment, a reference pattern is extracted around a feature of interest as follows. The center point of a feature is identified. The area within a specified radius (also referred to herein as a "pattern radius") of the center point is extracted as the extracted reference pattern. That is, the extracted reference pattern is defined to include everything that is within the specified radius from the center point of a feature of interest.

While the same rule may identify the same (or similar) feature in two different locations, the reference patterns surrounding the features may be different. For example, consider the tip-to-edge rule. From the perspective of the rule, the feature at two locations in the design may be identical. However, when the radius is extended around the features, the two resulting reference patterns may differ. If the two resulting reference patterns are the same, then the same reference pattern has been identified at two different locations.

In some embodiments, the pattern radius is utilized or is defined to compensate for proximity effects. In the example of a t-shaped feature, the feature may be critical not only on the basis of the tip-to-edge distance, but also due to proximity effects in the surrounding or immediate environment that may make it more likely for bridging of the tip and the edge to occur. Definition of an extracted reference pattern that includes the area surrounding or in the vicinity of a feature of interest allows for such proximity effects to be captured. In various embodiments, the radius can be defined either manually or automatically.

Database update engine 114 is configured to update pattern tracking database 116 with information pertaining to the empirical or observed printed features identified from high resolution images. In some embodiments, updating the pattern tracking database includes determining whether an extracted reference pattern generated around an identified feature of interest (using pattern extraction engine 112, as described above) is already present or is being tracked in database 116. In some embodiments, different semiconductor devices or different integrated circuit designs are tracked using their own corresponding pattern tracking database. In other embodiments, a pattern tracking database is used to track empirical data across multiple semiconductor devices.

In some embodiments, to ensure that reference patterns are uniquely tracked in the database (i.e. that the same reference pattern is not tracked as two different reference patterns), the reference patterns extracted from the newly lifted section are compared against existing reference patterns already present in the pattern tracking database.

In one example embodiment, the geometry of a reference pattern extracted from a design clip, as described above, is compared against the geometry of the existing reference patterns already being tracked by the database to determine whether there is a match. In this manner, the system determines whether the extracted reference pattern is already being tracked in the database.

In some embodiments, when searching the pattern tracking database, the type of feature of interest on which an extracted reference pattern was centered is used to filter the set of unique existing reference patterns that are searched, improving the speed and efficiency of determining matches. For example, suppose that an extracted reference pattern is one that encompasses a tip-to-edge feature (having been identified using a tip-to-edge rule). When determining whether this extracted reference pattern is already being tracked by the pattern tracking database, the extracted reference pattern is only evaluated against those unique reference patterns in the pattern tracking database that are related to (e.g., surround) tip-to-edge features. This reduces the amount of comparisons that need to be performed. In some embodiments, tracked reference patterns and extracted reference patterns are associated with metadata (e.g., a type identifier) indicating the type of feature of interest around which the pattern was generated (which may correspond to the type of rule that was used to identify the feature of interest).

In another embodiment, a 'hash code' technique is used to determine whether a newly extracted reference pattern matches an existing tracked reference pattern. This is accomplished by reducing the geometric shape information of the pattern to a single numeric value that uniquely represents that geometric shape. When all patterns are thusly reduced to single numeric values, it means that any two patterns having an equivalent numeric value (i.e., an equivalent hash code) are identical patterns. In this case, the task of determining whether a newly extracted reference pattern already exists in the tracking database is simply a task of computing the hash code for the newly extracted reference pattern and comparing it with the same code previously calculated and stored in the database for each existing tracking reference pattern.

In some embodiments, the radii used in extracting a pattern from a lifted design clip matches to or is consistent with the radii used to create the existing reference patterns to facilitate performing the comparison, but need not be. For example, if the radius of the extracted reference pattern and the existing reference pattern does not match, a comparison is made between the two by comparing the areas in the two patterns that are within the smaller of the two radii. This can be done because, in some embodiments, patterns are generated consistently by using the center point of a feature as the center point of the pattern (where the radius is determined from the feature center point).

If the extracted reference pattern matches to an existing reference pattern that is already being tracked in the database, then the information pertaining to the extracted reference pattern (e.g., measurement data, metadata, as described above) is added as another empirical data point to the existing reference pattern. For example, the information may be stored as another entry in a database row corresponding to the existing reference pattern.

In some embodiments, if the extracted reference pattern does not match to an existing reference pattern, then the extracted reference pattern is added to the pattern tracking database as a new reference pattern to be tracked, and the information pertaining to the extracted reference pattern (and the feature of interest included in the extracted reference pattern) is added as an empirical data point for the new reference pattern being tracked.

In some embodiments, the information pertaining to an extracted reference pattern that is stored in the database includes the empirical or raw measurement data (e.g., of the observed feature dimensions) associated with a feature of interest in a pattern, an amount of deviation between an actual observed feature dimension, as fabricated, and its intended dimension, as specified in a reference design. A fidelity score for the feature of interest, as described above, can also be stored.

In some embodiments, the contours of the portion of the high resolution image corresponding to the extracted reference pattern can also be stored in the pattern tracking database. In various embodiments, other metadata associated with the observed, fabricated pattern (represented by its contours) corresponding to the extracted reference pattern can be stored in the pattern tracking database, such as the lot ID (identifier) for the wafer from which the actual/observed pattern was obtained, the X,Y coordinate of the pattern (e.g., the center point of the pattern), a device identifier associated with the pattern, a layer identifier, the date/time (e.g., using a date/timestamp) at which inspection of the wafer was performed, the manufacturing step at which the inspection was done, calculated metrics, etc. Other examples of information that can be stored include information provided by other inspection tools, such as optical inspection tools, which can, for example, provide the number of defects found on a wafer.

In some embodiments, the metadata information associated with a extracted reference pattern includes defect information, such as a defect type classification, as described above.

In some embodiments, the metadata, raw measurement data, and calculated metrics for an empirical data point are stored in a table of the pattern tracking database. For example, the cell corresponding to a particular empirical data point in a row for a given reference pattern can include a link to another table that includes the metadata pertaining/corresponding to the particular data point. In another example embodiment, the pattern tracking data includes a summary data analysis table that includes a summary of overall statistics or other information for each reference pattern (e.g., aggregated based on analysis of image contours for the reference patterns). Each reference pattern references a table that includes more exhaustive data for the empirical data points corresponding to the reference pattern, such as the metadata, raw measurement data, and calculated metrics described above.

In some embodiments, once it has been determined that the design clip matching to at least a part of a device, wafer, or die captured in an image contains patterns from the pattern tracking database, a fidelity score (or multiple scores based on different criteria) for each of these constituent patterns is calculated, for example, as described above, from the extracted contours and added to the pattern tracking database. As an example, suppose that three patterns A, B, and C are extracted from the design clip and found to be contained in the pattern tracking database. Patterns A, B, and C may each have had five fidelity scores assigned to them from one or more previous high resolution images. After the new image is processed, a sixth score is inserted in the pattern tracking database for each of these patterns. However, if the extracted contours of the image contain a fourth pattern D that does not currently exist in the pattern tracking database, the new reference pattern will be inserted. This, in effect, allows automatic building of the pattern tracking database and tracking of reference patterns over time.

Thus, new reference patterns can be added to the database dynamically based on an analysis of high resolution images, as described above, a process referred to herein as "high resolution image decomposition." As described above, contours extracted from the high resolution image files are matched to a design clip and the design clip corresponding to the contours is searched for the existence of features of interest (e.g., "consequential" and/or "critical" features). From the design clip, patterns centered around those features are extracted. The extracted reference patterns, if they are not already being tracked, are added as new reference patterns in the pattern tracking database. Thus, the pattern tracking database is dynamically updated, and includes unique reference patterns determined based on an analysis of the high resolution images themselves. Thus, each time that a particular geometry (including a feature of interest) is observed, the fidelity score and any other information, as appropriate, can be added to the database to a corresponding reference pattern. Over time, as more high resolution images are processed, each reference pattern in the database may be associated with numerous data points. Various types of analysis can then be performed using the data, as will be described in further detail below.

In some embodiments, reference patterns to be tracked are added to the database as part of a process referred to herein as "physical layout decomposition," where, for example, prior to using the database (e.g., before a reticle (mask) is manufactured), pre-processing is performed to decompose the physical layout file into a set of unique patterns of a prescribed radius. The pattern tracking database is then pre-populated using the unique identified patterns. In one example embodiment of physical layout decomposition, an entire layout is comprehensively swept/evaluated using feature identification rules such as those described above to identify features of interest. Reference patterns are generated for each occurrence/location of a feature of interest by extracting or capturing the areas within a certain vicinity or radii of the center points of the features, similarly to that performed by pattern extraction engine 112, as described above.

In some embodiments, pattern grouping is performed to determine the unique patterns among the patterns that are extracted. For example, all of the identified patterns are grouped or de-duplicated to identify only unique or distinct patterns in the design that include features of interest. As one example, suppose that after physically decomposing an entire design, millions of occurrences of critical and consequential features are identified. Each rule that is used to search the design may result in numerous matches. For example, suppose that after running the tip-to-edge rule, millions of tip-to-edge features are identified. When radii are extended about each of the tip-to-edge features, millions of patterns surrounding or encapsulating each of the identified features result. Pattern grouping is performed on the generated patterns to identify the unique or distinct patterns. For example, the generated patterns are compared against each other, and patterns that are determined to be the same are grouped together. For example, the millions of tip-to-edge patterns that were extracted may ultimately result in only two thousand groupings, indicating that there are only two thousand unique patterns with tip-to-edge features in the design. The comparison can be made by matching patterns based on their geometries, such as by using the method described above for determining whether a pattern derived from analysis of a high resolution image matches to an existing reference pattern in the pattern tracking database.

Thus, repeated instances of patterns can be identified and grouped together to determine the unique and distinct patterns. The unique reference patterns are then added to the pattern tracking database. The populated database can be used to track the patterns in fabricated wafers/devices, as described herein. In some embodiments, physical layout decomposition is performed by layout decomposition engine 118.

In high resolution image decomposition, reference patterns to be tracked are generated based on analysis of images taken from actual wafers during the fabrication process, such as during an inspection step. When high resolution image decomposition is used, the number of patterns being tracked by the database may initially be lower compared to physical layout decomposition. This is because the patterns that are added will depend or rely on the high resolution images that are obtained and processed. However, each reference pattern that is added in the pattern tracking database will be associated with information for at least one empirical data point. On the other hand, in physical layout decomposition, the database is initialized with reference patterns for which data has not yet been collected, and empirical data for the reference patterns is not added until high resolution images including particular reference patterns are observed. It may be the case that actual data will not be obtained for all of the reference patterns in the pattern tracking database (e.g., some rows in the database will be empty). This may occur, for example, because a defect never occurred in the portions of fabricated wafers corresponding to a reference pattern, or because an obtained sub-sample of SEM review images did not include patterns matching to existing reference patterns. Over time, however, as more and more wafers are fabricated (i.e., the number of fabricated wafers grows), more and more empirical data is collected and used to populate the pattern tracking database.

In one embodiment, the pattern tracking database can be populated by physical layout decomposition. In another embodiment, the pattern tracking database can be populated by high resolution image decomposition. In another embodiment, the pattern tracking database can be populated by a combination of the above mentioned techniques.

The following is an example scenario in which system 100 is used to process an obtained image and update a pattern tracking database. Suppose, for example, that a SEM image is received. The contours of the SEM image are extracted and aligned to a corresponding portion of a reference layout or reference design. For example, suppose that the SEM image has a field of view of two microns by two microns. The SEM image is aligned to the reference design to determine which portion of the reference design corresponds to the SEM image. A matching two micron by two micron clip from the design is identified and lifted from the physical layout file as the lifted design clip. A rule-based search is run against the lifted design clip. Suppose, for example, that after running the tip-to-edge rule, two locations in the lifted section are flagged by the rule as being features of interest (e.g., critical and consequential). As contour extraction of the SEM image has been performed, the contours corresponding to these locations can be extracted. In some embodiments, the extracted contours are superimposed on the corresponding locations of the lifted design clip to determine the locations in the extracted contours of the features of interest. In other embodiments, the locations of the features of interest in the design clip are identified (e.g., using coordinates provided by the rule-based pattern search). The corresponding location of the feature in the extracted contours (which are aligned to the design clip) is also identified. The extracted contours at the locations of the identified features of interest are compared against their corresponding locations in the reference design. For example, the observed (e.g., printed) dimensions of a feature can be measured, and the intended dimensions of the feature computed (e.g., from the reference design). The deviation between the extracted contour and the intended design can then be determined. Fidelity scores can also be calculated. Any anomalies can also be determined. Defect detection and classification can also be performed (e.g., to determine whether one or both of the locations in the SEM image are bridges, breaks, pullbacks, etc.).

Query/reporting engine 122 is configured to facilitate querying and reporting of the data stored in the pattern tracking database. For example, when a new set of pattern fidelity scores is inserted into the pattern tracking database (for example after all the high resolution images from a particular wafer at a particular manufacturing step have been analyzed), a pattern quality trend report can be generated and exported automatically. In one embodiment, new sets of patterns and pattern fidelity scores are inserted into the pattern tracking database in-line with the tools that generate the high resolution images in the manufacturing or fabrication flow. This allows the manufacturing line to be monitored and/or controlled in real-time based on pattern fidelity metrics and pattern fidelity trends computed by the system of the present invention. Examples of report export include, but are not limited to, the following: (a) the report can be exported to the fab's Manufacturing Execution System (MES) for automated line control, (b) the report can be saved to disc as a file, (c) the report can be sent to one or more users via push mechanisms such as email, and (d) the report can be published to a website (e.g., an intranet website, an internet website, etc.).

Further analysis of the empirical data collected and stored in the pattern tracking database can also be performed using further analysis engine 120. For example, the raw measurement data, fidelity scores, defect detection/classification, and metadata associated with identified features (that are included in extracted reference patterns), as described above, can be used to calculate a variety of metrics as well as perform various types of analyses. For example, using the stored data, an assessment of how fabricated wafers/devices compare to their intended design can be determined. The stored data can also be used for predictive purposes, for example, to determine what areas of the design have an impact on yield.

As one example, for a given reference pattern tracked by the pattern tracking database, aggregate metrics or statistics can be determined based on collected empirical data pertaining to the reference pattern. For example, an aggregate fidelity score for a given reference design pattern can be computed using the empirical data collected for that reference pattern. As will be described in further detail below, such information can be used to assess the strength/weakness of a pattern. The aggregate fidelity score can be updated as more data points are obtained. In some embodiments, the aggregate fidelity score is determined at the time that a query that will utilize the data is received.

As another example, a statistical analysis of the empirical data for reference patterns can be performed. For example, various statistical measures, such as means, distributions, standard deviations, etc. can be calculated. In the example of a pattern that includes a tip-to-edge feature, statistical analysis of the measured gaps between tips and edges across multiple empirical data points can be performed to determine, for example, the distribution of the gap measurements, what the average fabricated gap is, the standard deviation of the gaps, etc. As another example, a box plot or scatter plot of the observed gaps can be generated and provided as output in a report, allowing visualization of the empirical data for the pattern/feature of interest.

The empirical data collected or calculated that is stored in the pattern tracking database is made available for querying (e.g., via query/reporting engine 122) in a variety of manners. For example, a graphical user interface (GUI) can be provided. As another example, command line instructions can be used to access the data. The data can be queried/segmented according to various attributes, such as the metadata attributes stored for the various data points associated with the various reference patterns. As one example, a user can query for raw data pertaining to a particular wafer (e.g., by wafer id). As another example, the user can query for raw data pertaining to a particular date/time (e.g., before and after a mask revision). Data can be segmented according to any combination of metadata, as appropriate.

In some embodiments, the information stored in the pattern tracking database can be used to evaluate the capability of a manufacturer's fabrication line to determine, for example, what areas of fabrication are weak, what are not weak, etc. In some embodiments, weak patterns are those for which fabrication did not repeatedly and consistently match closely to the intended design, while strong patterns are those whose fabrication repeatedly and consistently matched closely to the intended design. In some embodiments, the weakness/strength of a pattern is determined based on fidelity scores calculated for the patterns. In some embodiments, the determination of whether a pattern is weak or strong is based on a statistical analysis of corresponding empirical data. An example of determining weakness/strength of patterns is described in further detail below in conjunction with FIG. 8.

The pattern strength/weakness information can then be accessed by a user. For example, the database can be queried to return all patterns that have weak scores. As another example, a ranked list of the reference patterns from weakest to strongest can be returned. Alternatively, all or some of the empirical data for the tracked reference patterns can be queried, and a calculation can be performed on-demand to assess the overall strength or weakness of the patterns. The patterns that had the weakest fabrication can then, for example, be prioritized during inspection. The information can then be fed back to determine revisions to be made to the fabrication process. For example, the information can be provided to OPC (Optical Proximity Correction) lithography teams/engineers so that they can perform mask revisions if needed. Such strong/weak pattern information can also be provided to designers, allowing them to understand what geometries are yielding poorly. The designers can then change the layout accordingly.

As another example of utilizing the information stored in the pattern tracking database, in order to evaluate the effects of the mask revision, the pattern tracking database can be queried for data before and after the mask revision. For example, information/records can be queried by date/time (e.g., using the date/timestamp metadata that was stored that indicates when an empirical data point was inspected/captured). The empirical data can, for example, be grouped according to date and time (e.g., where a user can specify date/time ranges). The timestamps can be used, for example, to calculate and view metrics/statistics relating to reference patterns both before and after the mask revision. For example, the differences in the weakness/strength (i.e., whether the pattern yields poorly or well) of patterns before and after the mask revision can be visualized and compared. An example embodiment of a process for assessing the impact of a mask revision is described in conjunction with FIG. 10B.

As described above, reports can be generated based on the data stored in the pattern tracking database. The reports can be exported in a variety of formats, such as spreadsheets, comma separated values (CSV) files, HTML reports, etc. One example of a report that can be generated lists all of the unique patterns tracked by the pattern tracking database, the intended dimensions of features in the patterns, and the actual dimensions measured from fabricated wafers. In some embodiments, the reports are generated by summarizing information (e.g., that is queried for or requested by the user). For example, a report that summarizes what occurred for a particular wafer (e.g., using pattern data that is associated with corresponding Lot and Wafer ids) can be generated. The reports can also be used to provide visualizations of pattern tracking data. For example, a visualization of statistical analysis performed (e.g., plots/graphs of distributions, means, standard deviations, histograms, etc.) can be generated. Examples of such plots are described in further detail below in conjunction with FIG. 8

Once the pattern tracking database is created (and continues to be updated as new high resolution images are processed), various applications of the database can be realized. For example, the information collected and stored to the pattern tracking database can be used to provide intelligent feedback to various phases of the fabrication (and design) process, as described above. Further examples of such applications are described below.

For example, following a modification or revision in the fabrication process, when photomasks (e.g., glass plates inscribed with the intended physical layouts) and/or process conditions are revised, the impact of those revisions on the fidelity (or empirical score) of the printed pattern can be assessed and tracked. In addition, patterns that are deemed weak or strong can be compared against a fab's photolithography simulation result (e.g., Optical Proximity Correction (OPC), Optical Rule Check (ORC)) to assess the accuracy of those simulation models.

Further, as OPC and ORC models can either over-predict or under-predict weak patterns, a comparison with actual empirical data provides a better and more stable feedback loop resulting in a better simulation model and hence an improved photomask or physical layout. Furthermore, knowledge of the locations of weak patterns and potential weak patterns can be used to direct inspection, metrology, and imaging tools to those locations.

As another example, the pattern tracking database can be queried for patterns whose overall fidelity scores are lower than a specified threshold, or patterns whose individual fidelity scores are trending lower. This information can be used for various purposes including, but not limited to, (a) generation of care areas for wafer inspections, (b) generation of locations for targeted high resolution imaging via tools such as Review SEMs and E-Beam Tools, (c) geometric analysis of the weak (or weakening) patterns to identify any shape-related cause, (d) assessing the manufacturability of a new device that may contain one or more of these weak (or weakening) patterns.

As another example, in one embodiment, analysis and overlay of the reference pattern and the extracted contour facilitates determining the exact location of a defect (as found in the high-resolution image) on the physical layout (the intended or reference design). This identifies the exact polygon(s) in the physical layout that were impacted by the manufacturing defect. This precise information opens new yield enhancement opportunities. For example, it becomes possible to reduce or eliminate measurement error from the (x,y) location of the defect as reported by the inspection equipment. As another example, it becomes possible to accurately map Electrical Fault Diagnostics results from the end of the manufacturing process to defects captured by inline inspection tools during the actual manufacturing process. Because Electrical Fault Diagnostics results can be converted to a set of 'candidate nets' that are mapped to the physical layout file, knowing the precise locations of the nets within the physical layout, and knowing the precise locations of the manufacturing defects within the same physical layout, it becomes possible to determine if there might be a cause-effect relationship between the two. As a third example, the precise location of a defect on the reference design identifies the actual impacted polygon or polygons of the reference design. It then becomes possible to perform a "net trace" operation to determine any of the following types of information about the impact site: (a) whether the electrical connection from that site is still viable due to the presence of an alternative or redundant electrical connection such that a defect at the impact site will not "kill" the chip, (b) whether the polygon at the impact site connects to the Active (Diffusion) layer or to the Poly layer or to any other layer of interest. Knowledge of the connection endpoint can be used to determine whether "Dark VC" defects reported by an E-Beam inspection tool operating in Voltage-Contrast (VC) mode are real defects or 'uncertain' defects.

In some embodiments, the processing performed by system 100 is performed inline, and integrated (e.g., plug and play) with the fabrication process in a non-intrusive manner that minimizes the amount of changes to the manufacturing process (e.g., to plans of record).

System 100 is illustrated as a single logical device in FIG. 1. In some embodiments, system 100 comprises standard commercially available server hardware (e.g., a multi-core processor, 4+ Gigabytes of RAM, and one or more Gigabit network interface adapters) and runs typical server-class operating systems (e.g., Linux), as well as Java HTTP server software stack. System 100 can also be implemented using a scalable, elastic architecture and may comprise several distributed components, including components provided by one or more third parties. Further, when system 100 is referred to herein as performing a task, such as storing data or processing data, it is to be understood that a sub-component or multiple sub-components of system 100 (whether individually or in cooperation with third-party components) may cooperate to perform that task.

Figure 2A:
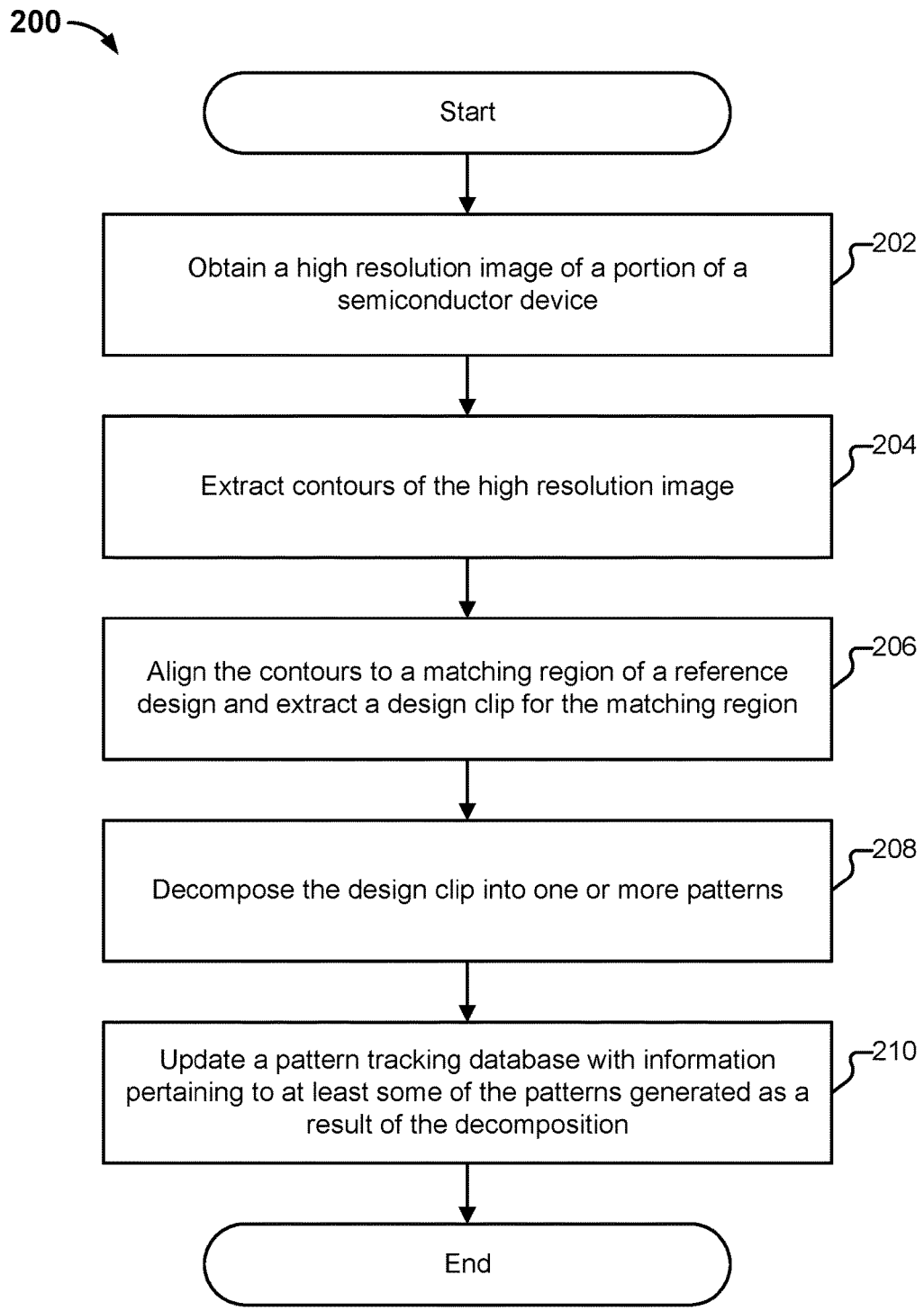
FIG. 2A is a flow diagram illustrating an embodiment of a process for pattern tracking during a semiconductor device fabrication process.

FIG. 2A is a flow diagram illustrating an embodiment of a process for pattern tracking during a semiconductor device fabrication process. In some embodiments, process 200 is executed using system 100 of FIG. 1. In some embodiments, process 200 can be used to extract contours from high resolution images, align them to the physical layout, and decompose a design clip corresponding to the portion of the design captured in the high resolution image into patterns for tracking in a pattern tracking database. As described above, a pattern includes one or more features that are extracted either from the physical layout file or from a portion of the physical layout file identified as matching to a high resolution image of at least a part of the die. A feature, in an embodiment, is defined by a line or polygon shape, where the shape represents at least a part of an electronic circuit (e.g., without limitation, transistor, capacitor, resistor, electronic interconnect, logic gate, etc., or a combination thereof). A feature can also be defined by the spacing between lines or polygon shapes.

The process begins at 202, when a high resolution image of a wafer during fabrication is obtained. The high resolution images can include images of test or production wafers, and can span large or small areas of the wafer. In various embodiments, the high resolution images are produced using E-Beam tools, SEM Defect Review tools, or any other tool capable of producing images with sufficient resolution, as appropriate. As one example, an inspection tool reports the coordinates of defects. The coordinates may contain a degree of measurement error and the defect itself may or may not be of interest. High resolution images of a subset of the reported defects are generated, for example, using a SEM Defect Review tool. The high resolution images generated by the SEM Defect Review tool are obtained for further processing.

At 204, contour extraction is performed on the obtained high resolution image. In some embodiments, contours of the printed patterns captured in the image are extracted, where the contours are closed curves/boundaries of the printed patterns of an electronic circuit formed on a fabricated wafer captured in the image. In some embodiments, contour extraction includes extracting a polygonal representation of the boundaries of printed patterns captured in the high resolution image. The contours can be identified, for example, based on edge detection, as described above.

In some embodiments, any textual or graphical annotation added to the high resolution image (e.g., by the capturing tool) are removed before the contours from the high resolution image are extracted, as described above.

At 206, the extracted contours of the high resolution image are aligned/matched to a reference design. In some embodiments, the reference design is a physical layout of a semiconductor device being fabricated. Examples of physical layout files include Graphical Data System (GDS)/Open Artwork System Interchange Standard (OASIS) files.

In some embodiments, aligning the extracted contours of the high resolution image to the reference design includes determining what section of the reference design matches the extracted contours of the printed patterns captured in the obtained image. This can be performed by comparing the extracted contours to various portions of the reference design and identifying a best fit between the extracted contours and a section of the reference design. The comparison or determination of the matching section can be performed using bitmaps and/or vectorization, as described above, or any other techniques, as appropriate. In one embodiment, the coordinates of the high resolution image from which the contours were extracted is used as a starting point for the search in the reference design. Coordinate measurement errors (e.g., introduced by inspection tools) can be compensated for, as described above. Once the contours have been matched with the reference design, the matched section (i.e., where the extracted contours match the physical layout) is lifted (also referred to herein as the lifted design clip, or lifted section).

At 208, the lifted design clip is decomposed into one or more reference patterns. In some embodiments, the lifted design clip is decomposed by identifying features of interest in the lifted design clip. As described above, in some embodiments, a rule-based search is run against the matched section to identify features of interest, such as tip-to-edge or dense thin lines, etc. More than one feature of interest may be identified within the matched section.

Each feature of interest in the lifted design clip is compared against the contours of the feature of interest as extracted from the high resolution image. This allows for a comparison of the feature, as printed, against the feature as it was intended in the design or layout. In some embodiments, performing the comparison includes determining the dimensions of the feature of interest in the lifted design clip (i.e., determining the intended dimensions of the feature of interest, as defined in the reference design) and measuring the dimensions of the extracted contours of the feature of interest (i.e., measuring the dimensions of the feature of interest as it was actually fabricated/printed). For example, using the location of the feature of interest in the design clip (determined using the rule-based search), the corresponding location of the feature of interest in the extracted contours of the image can also be identified (because the contours have been aligned with the reference design). This allows the contours of the feature of interest, as fabricated, to be identified.

The measured dimensions of the feature of interest, as fabricated, are compared against the intended dimensions of the feature of interest, as specified in the reference design. In some embodiments, a deviation, or difference, or comparison, or delta between the intended and actual measurements is calculated. In some embodiments, a fidelity score, as described above, is calculated using the raw measurements. In one embodiment, the fidelity score is a metric that is indicative of the printability and stability of a given pattern (that includes the feature of interest) in a given physical layout file.

As will be described in further detail below, the deviation between the dimensions of the actual or fabricated feature and the intended dimensions of the feature can be used to determine whether a defect occurred. In some embodiments, the type of the defect can be determined, as described above. It can also be determined, based on the measurements/comparison, whether or not a failure occurred. Measurements aggregated across multiple empirical data points collected over time can also be used to determine whether a pattern generated around a feature of interest is strong or weak, as described above.

An example embodiment of a comparison of the printed features versus their intended design to deduce fidelity scores is described in conjunction with FIG. 7.

For each feature of interest identified in the lifted design clip, a surrounding pattern centered on a given feature of interest is extracted from the lifted design clip as the extracted reference pattern. As described above, in one embodiment, an extracted reference pattern is lifted directly from the neighborhood of an identified feature of interest. As one example, the center point of the location of the feature of interest is determined. The area within a specified radius of the feature of interest is extracted from the lifted design clip as the extracted reference pattern. This results in a decomposition of the matched design section into patterns. In some embodiments, the contours of the portions of the image corresponding to the patterns extracted from the design clip are also extracted.

Each extracted reference pattern is associated with observed or empirical information pertaining to the feature of interest on which the extracted reference pattern is centered. This can include the raw measurement of the dimensions of the feature of interest as printed, any calculated metrics (e.g., deltas, fidelity scores, etc.), as well as the contours for the printed feature of interest as derived from the obtained image. A given extracted reference pattern can also be associated with other corresponding metadata as well, such as the lot ID for the wafer from which the empirical data was collected, the X,Y coordinate of the feature of interest on which the extracted reference pattern is centered (in the design and/or the wafer), a device identifier, a layer identifier, a timestamp (e.g., of when inspection of the wafer was performed), the manufacturing step at which inspection of the wafer was performed, etc.

In various embodiments, extraction of the surrounding pattern centered on a feature of interest and comparison of the feature of interest in the lifted design clip against the contours of the feature of interest as extracted from the high resolution image can be performed in any order, as appropriate.

At 210, a pattern tracking database is updated with information pertaining to at least some of the patterns generated as a result of the decomposition of the lifted design clip. In some embodiments, updating the database includes determining, for each extracted reference pattern generated as a result of the decomposition described above, whether the extracted reference pattern is already being tracked in the pattern tracking database (e.g., matches to an existing reference pattern in the pattern tracking database). In some embodiments, this includes comparing the geometry of the extracted reference pattern (derived or converted from the high resolution image) against the geometries of existing reference patterns being tracked in the pattern tracking database.

If the extracted reference pattern is already being tracked (i.e., the extracted reference pattern is found to match to an existing reference pattern in the pattern tracking database), the information pertaining to or associated with the feature of interest on which the extracted reference pattern was centered is stored in the database as empirical data for the matching existing reference pattern. For example, the information stored in the pattern tracking database can include the extracted contours of the feature of interest, as printed, raw measurement data, fidelity score, metadata, and other data, as described above.

If the extracted reference pattern is not already being tracked (i.e., the extracted reference pattern is not found to match to any existing reference patterns in the pattern tracking database), in some embodiments, the extracted reference pattern is added to the pattern tracking database as a new reference pattern to be tracked. Information pertaining to the feature of interest on which the extracted reference pattern was centered (e.g., corresponding contours of the feature of interest, raw measurement data, fidelity score, metadata, etc., as described above) is also stored as empirical data for the newly created reference pattern.

Over time, as more and more images of fabricated wafers are processed, the pattern tracking database is populated with more empirical data relating to reference patterns being tracked by the pattern tracking database. Various types of analysis can be performed using the information stored in the pattern tracking database. For example, defect detection and classification can be performed. For example, the extracted contours of an image of a portion of a die is compared with the reference design to determine the locations at which deviations have occurred. Determination can be made as to whether those locations are in fact defects. The detected defects can be classified according to their type (e.g., hard or soft defects such as a hard-break, a hard bridge, line pull back, partial break, partial bridge, etc.).

The defect type classification can then be stored into the pattern tracking database. For example, a code or any other appropriate identifier of a defect type is associated with the reference pattern for which a defect was observed in fabrication and classified. In some embodiments, a report can be provided as output that indicates the defects that have been detected, their type/classification, and the location of the defects.

The information stored in the pattern tracking database can be used to perform other types of analysis as well, such as determining the strength and/or weakness of patterns. For example, the strength or weakness of a given pattern can be determined by analyzing stored metrics associated with the empirical data gathered for the given pattern. For example, an analysis (e.g., statistical analysis) of the various fidelity scores calculated for the given pattern can be used to determine the pattern weakness or strength. Example embodiments of using fidelity scores and other empirical data to determine pattern strength (or weakness) are described in further detail below in conjunction with FIGS. 7 and 8.

In some embodiments, reports can be generated based on the data stored in the pattern tracking database. For example, pattern quality trend reports can be generated. The generated reports can then be exported. The reports can be exported in a variety of manners, for example, to Manufacturing Execution Systems (MES), by creating files on disc, emailing the reports to user(s), publishing reports to websites, etc. Other examples of reports include HTML reports, spreadsheets, and visualizations of data stored in the pattern tracking database (e.g., statistical analysis, graphs, plots, etc.).

Figure 4:
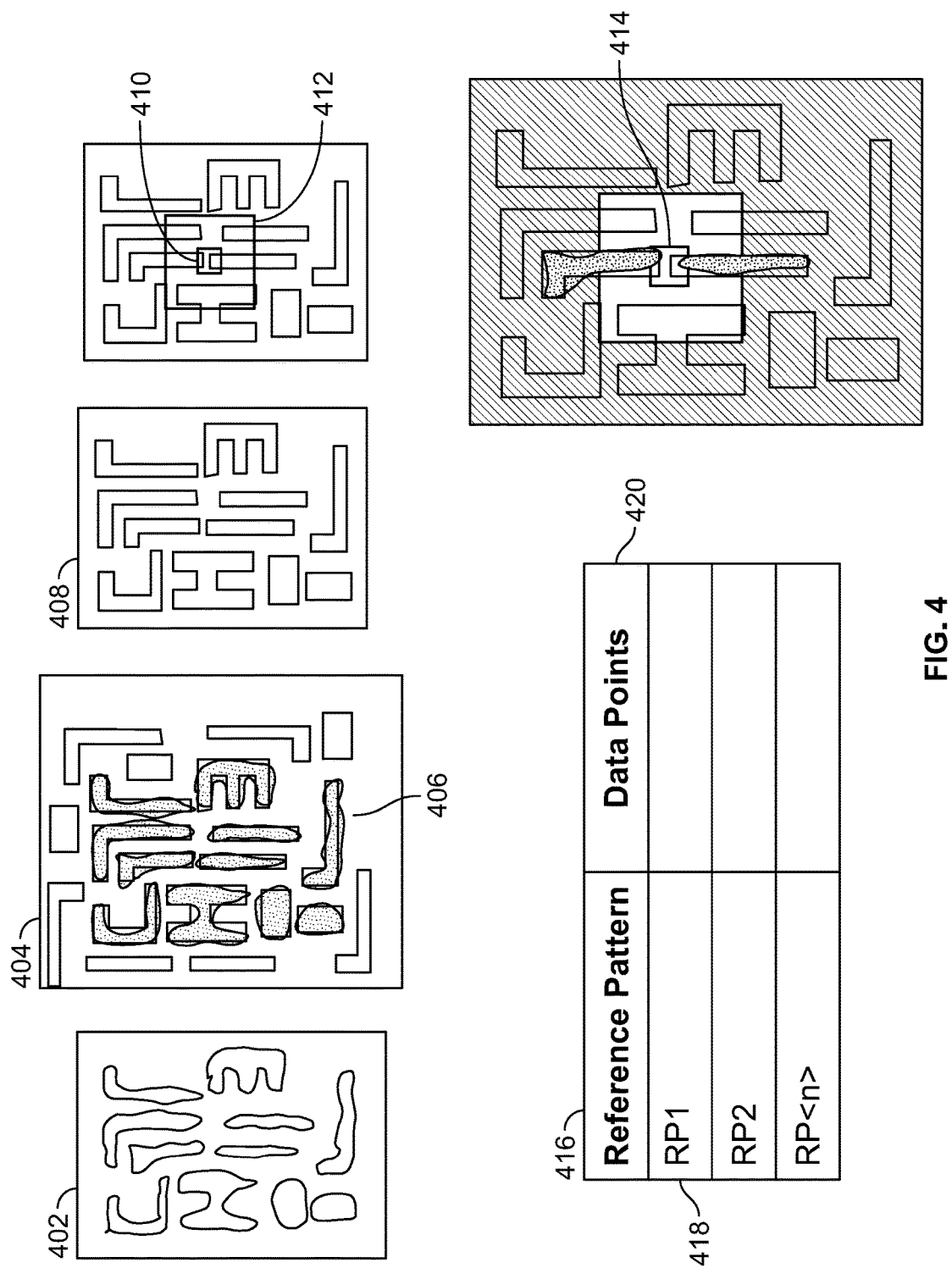
FIG. 4 illustrates an embodiment of an example in which a high resolution image is processed and a pattern tracking database is updated.

An example of the processing performed using process 200 is described in conjunction with the example illustrated in FIG. 4.

Figure 2B:
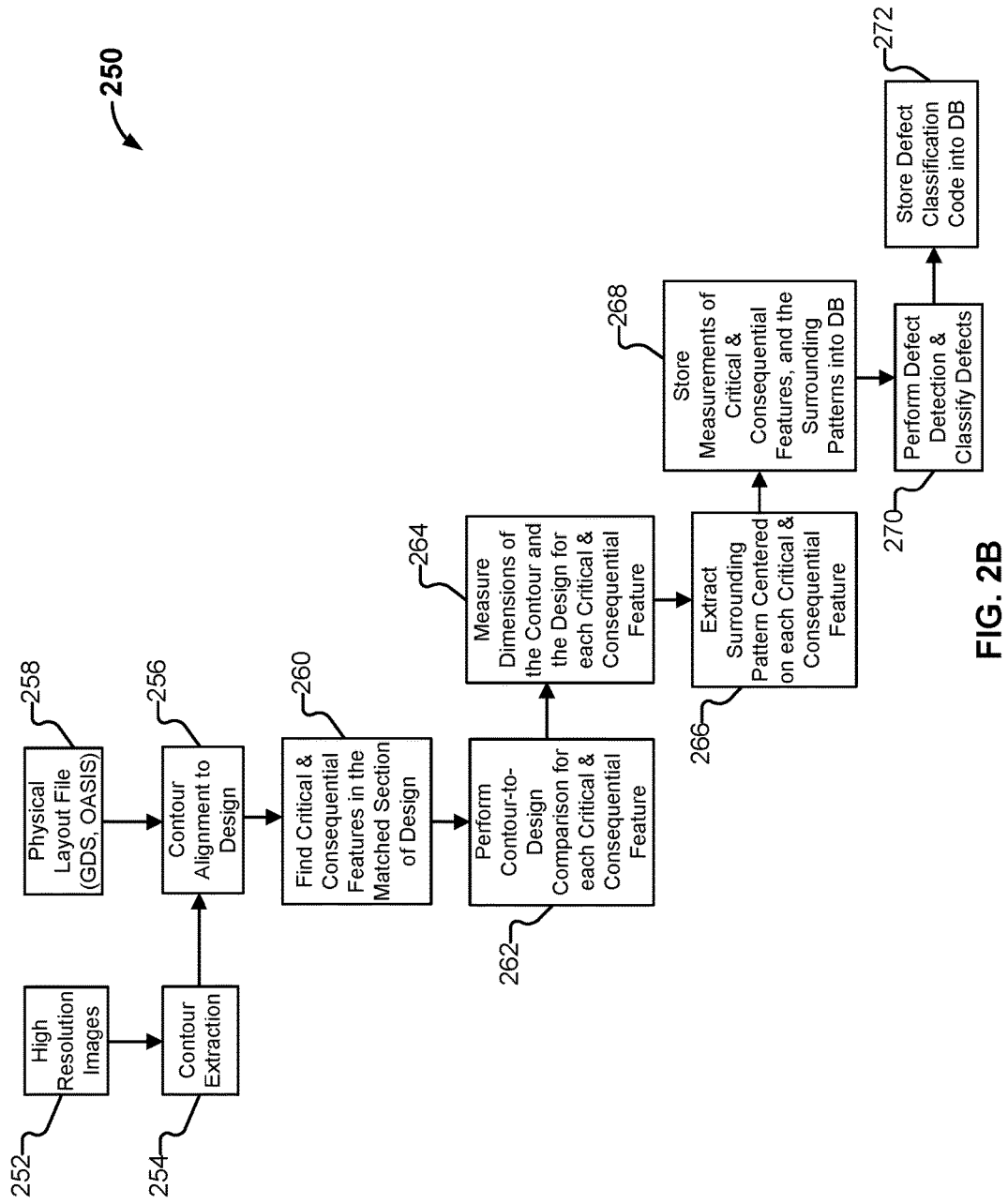
FIG. 2B is a flow diagram illustrating an embodiment of a process for pattern tracking during a semiconductor device fabrication process.

FIG. 2B is a flow diagram illustrating an embodiment of a process for pattern tracking during a semiconductor device fabrication process. In some embodiments, process 250 is executed using system 100 of FIG. 1 and is an alternate embodiment of process 200 of FIG. 2A. The process begins at 252, when a high resolution image of a wafer being fabricated is received. In some embodiments step 252 is implemented using process step 202 of FIG. 2A. At 254, contour extraction is performed on the received image. In some embodiments, step 254 is implemented using process step 204 of FIG. 2A. At 256, the extracted contour is aligned to a physical design (258), such as described by a physical layout file. As described above, in some embodiments, aligning of the contours of the image to the design results in the determination of a matched section of the design that corresponds to the extracted image contours. In some embodiments, step 256 is implemented using process step 206 of FIG. 2A. At 260, features of interest (e.g., critical and consequential features) in the matched section of the design are identified (e.g., using a rule-based pattern search as described above). At 262, for identified feature of interest, the contours of the feature as printed (which reflects how the feature was fabricated) are compared to the feature as it was intended according to the physical design or physical layout file). At 264, for each identified feature of interest, the dimensions of the feature as printed are measured using the contours of the feature, and the intended dimensions of the feature are determined (e.g., from the physical layout file/matched section). At 266, surrounding patterns centered on each identified feature of interest are extracted (e.g., an area within a radius of a feature of interest is extracted for each identified feature of interest). In some embodiments, process steps 260-266 are implemented using process step 208 of FIG. 2A. At 268, measurements, metrics, metadata associated with the identified features of interest, and the extracted reference patterns surrounding the features of interest, are stored to a pattern tracking database (e.g., updating the pattern tracking database, as described at step 210 of FIG. 2A). The information stored in the pattern tracking database can be used to perform other types of analysis. For example, at 270, defect detection and classification of defects is performed. At 272, the classification of defects (e.g., identified by a classification code) is stored in the pattern tracking database.

An example of the processing performed using process 250 is described in conjunction with the example illustrated in FIG. 4.

Figure 3:
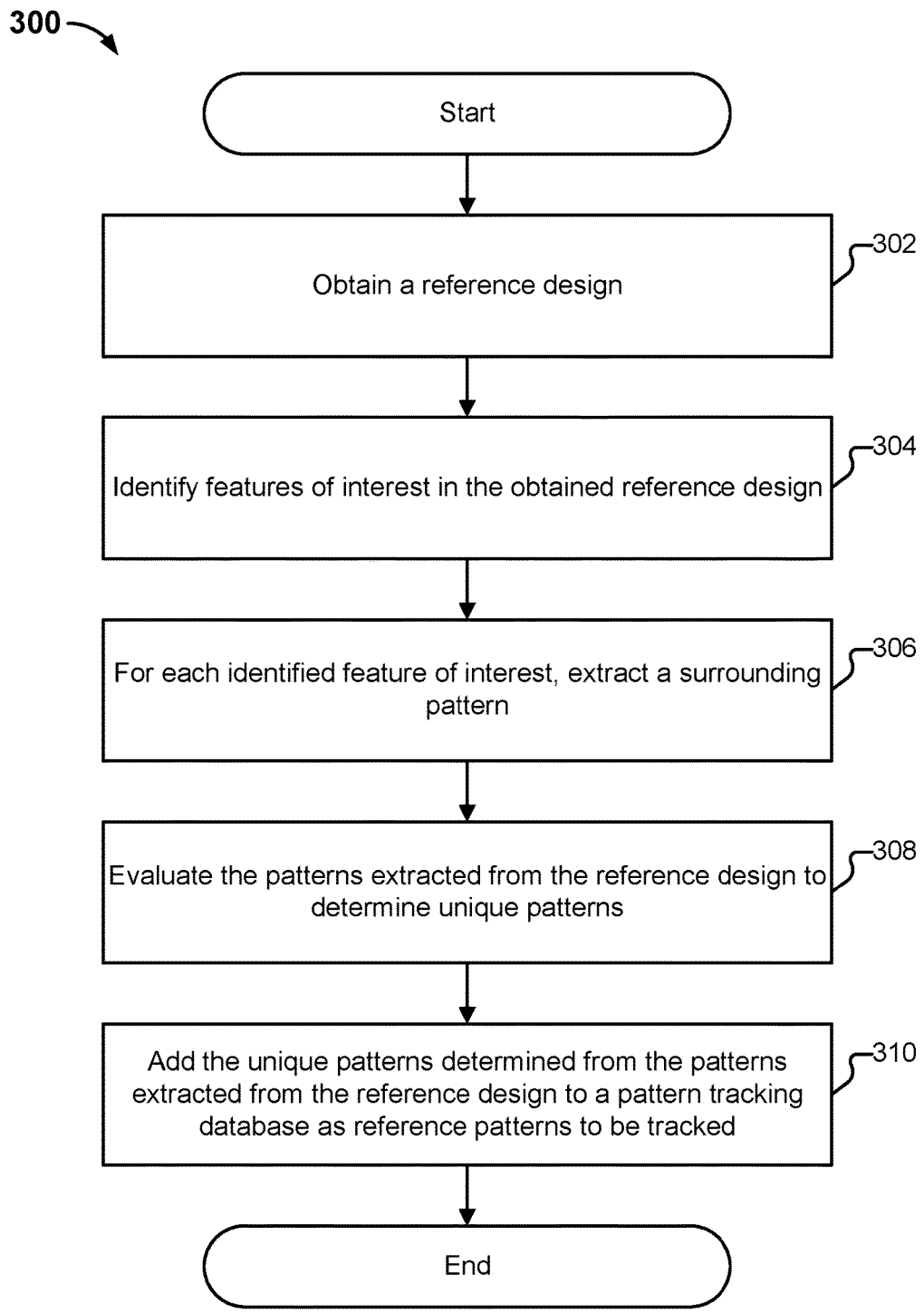
FIG. 3 is a flow diagram illustrating an embodiment of a process for performing physical layout decomposition.

FIG. 3 is a flow diagram illustrating an embodiment of a process for performing physical layout decomposition. In some embodiments, process 300 is executed using layout decomposition engine 118 of system 100 of FIG. 1. The process begins at 302, when a reference design is obtained. As described above, examples of reference designs include physical layout files such as Graphical Data System (GDS) and Open Artwork System Interchange Standard (OASIS) files.

At 304, features of interest are identified in the obtained reference design. For example, as described above, a rule-based pattern search engine, in which rules such as "minimum line width" or "minimum line space" or other consequential and critical features are specified can be run on the obtained reference design to identify features of interest in the obtained reference design.

At 306, a pattern is extracted for each identified feature of interest. For example, as described above, a surrounding pattern centered on an identified feature of interest (e.g., that is within a particular radius of the identified feature of interest) is extracted from the obtained reference design.

At 308, the patterns extracted from the reference design are evaluated to determine unique patterns. In some embodiments, the unique patterns are determined by performing pattern grouping of the patterns extracted from the reference design. For example, the extracted reference patterns that are the same can be binned, grouped, or clustered together, where each group corresponds to a unique pattern.

At 310, the unique patterns determined from the patterns extracted from the reference design are added to a pattern tracking database as reference patterns to be tracked. For example, the unique patterns are added as new entries in the pattern tracking database. As one example, each unique pattern is associated with a corresponding row in a table of reference patterns in the pattern tracking database.

After the reference patterns to be tracked are established in the pattern tracking database, empirical data associated with features of interest, as fabricated, can be associated with corresponding reference patterns in the pattern tracking database (e.g., the reference pattern in the pattern tracking database that matches to a pattern extracted from a lifted design clip that is centered on the feature of interest, as described above). For example, empirical data associated with a pattern derived from processing a high resolution image, (e.g., using processes 200 and 250, as described above), can be added as a new entry in the row for the corresponding reference pattern in the pattern tracking database.

FIG. 4 illustrates an embodiment of an example in which a high resolution image is processed and a pattern tracking database is updated. In some embodiments, the processing of high resolutions images as shown in the example of FIG. 4 is performed using system 100 of FIG. 1 and process 200 of FIG. 2A and/or process 250 of FIG. 2B.

At 402, an example of extracted contours of printed patterns captured in a high resolution image is shown. As shown at 404, the extracted contours of the image are aligned to a reference design (e.g., aligned to physical layout). The matching section of the reference design that is aligned with the extracted contours is shown at 406. The matched section or design clip is the portion of the physical layout that matches the extracted contours of the image. The matched section of the design is lifted, as shown at 408. A rule-based search is performed on the matched section 408 to find features of interest (e.g., critical and consequential features), where there may be more than one feature of interest per matched section. An example of a feature of interest that is identified in the matched section 408 is shown at 410. A surrounding pattern centered on the identified feature of interest is extracted as an extracted reference pattern, as shown at 412. While the extracted reference pattern is tracked in a pattern tracking database, in some embodiments, measurement and determination of metrics such as a fidelity score is performed only with respect to the feature of interest (410). In some embodiments, the size of the extracted reference pattern is configurable (e.g., by a user defining the radius for the pattern), as the preferred size for the pattern may vary based on different situations. A default radius can also be used. A radius can also be automatically determined (e.g., based on the type of feature being evaluated). In the example shown, at 414, the contours of the identified feature of interest 410, as printed and captured in the image, are compared against the extracted reference pattern of the reference design to determine a fidelity score (as shown, the extracted contours for the feature of interest are overlaid on top of the intended design of the feature of interest). Raw measurement data is also preserved in the pattern tracking database. An example of a table in a pattern tracking database is shown at 416. Reference patterns RP1 (418) to RP<n> correspond to patterns of the reference design that are being tracked by the pattern tracking database. In the example shown, each reference pattern is associated with its own corresponding row in the table. As shown at 420, empirical data points (e.g., raw measurements, fidelity score, metadata, etc.) for features of interest are stored to the rows of reference patterns that correspond/match to the patterns that are extracted around the features of interest identified as a result of processing high resolution images. For example, if the extracted reference pattern 412 matched to tracked reference pattern RP1 (418), then the raw measurement and fidelity score for feature of interest 410 (around which pattern 412 was extracted) is stored at the row for tracked reference pattern RP1. In some embodiments, each cell in the row of the tracked reference pattern points to another table that includes the metadata for a corresponding empirical data point.

Figure 5:
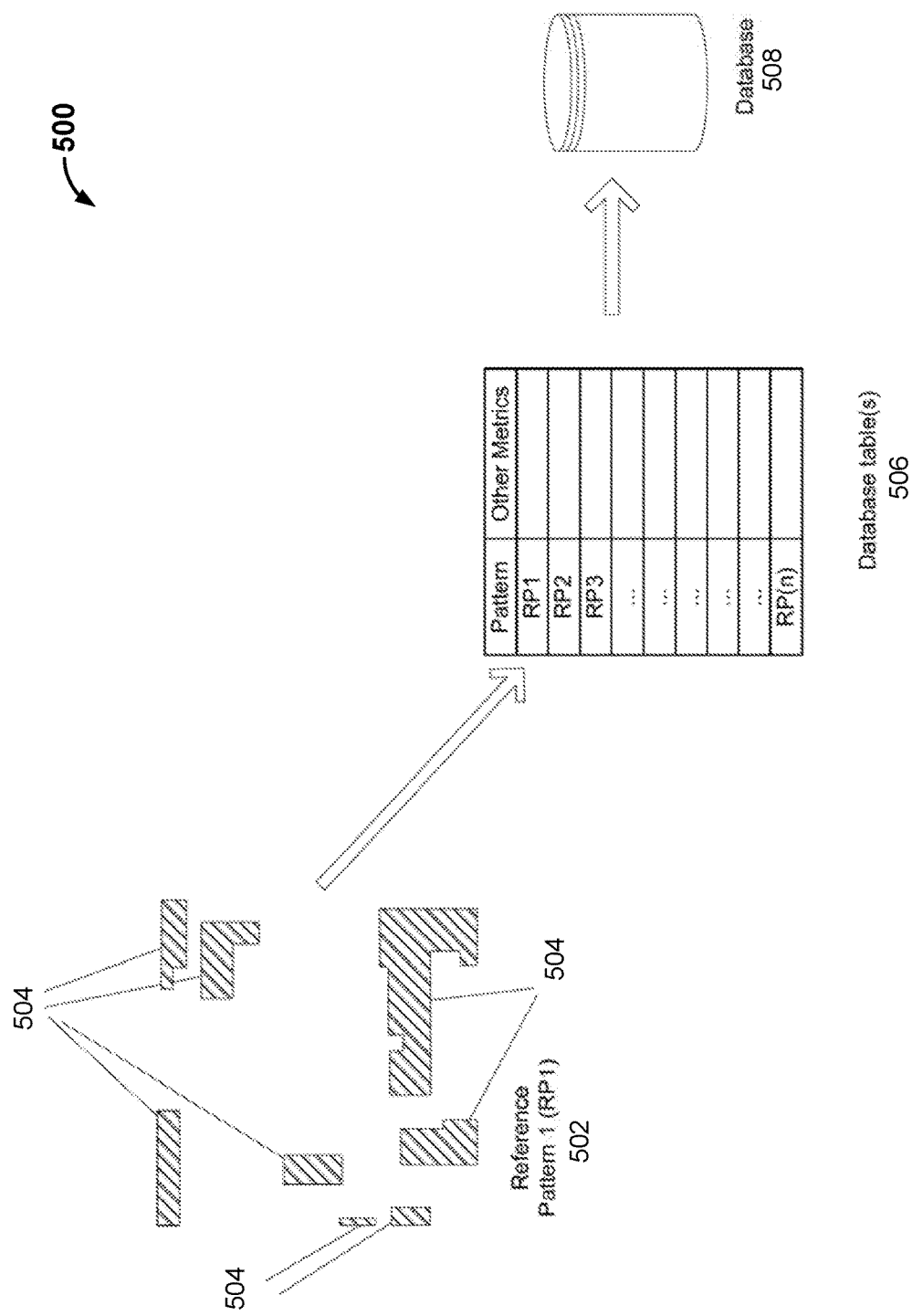
FIG. 5 illustrates a diagram describing an example embodiment of a database comprising reference patterns used to score and track high resolution images of a semiconductor device being fabricated.

FIG. 5 illustrates a diagram 500 describing an example embodiment of a database comprising reference patterns used to score and track high resolution images of a semiconductor device being fabricated. In this example, Reference Pattern 1 (RP1), 502, can include lines and/or polygon shapes that represent at least one feature 504 from the physical layout file. In one embodiment, database table 506 comprises multiple reference patterns shown as exemplary patterns RP1, RP2, RP3, . . . , RPn. In another embodiment, database table 506 also includes the coordinates of the locations where the reference patterns are found in the physical layout file and/or the wafer or die. In one embodiment, Reference Pattern 502 can be stored in one or more tables in database 508. In some embodiments, database 508 is an example of pattern tracking database 116 of FIG. 1. In yet another embodiment, any data storing mechanism (e.g., text files, binary files, etc.) can be employed to store the data related to the reference patterns 502.

Figure 6A:
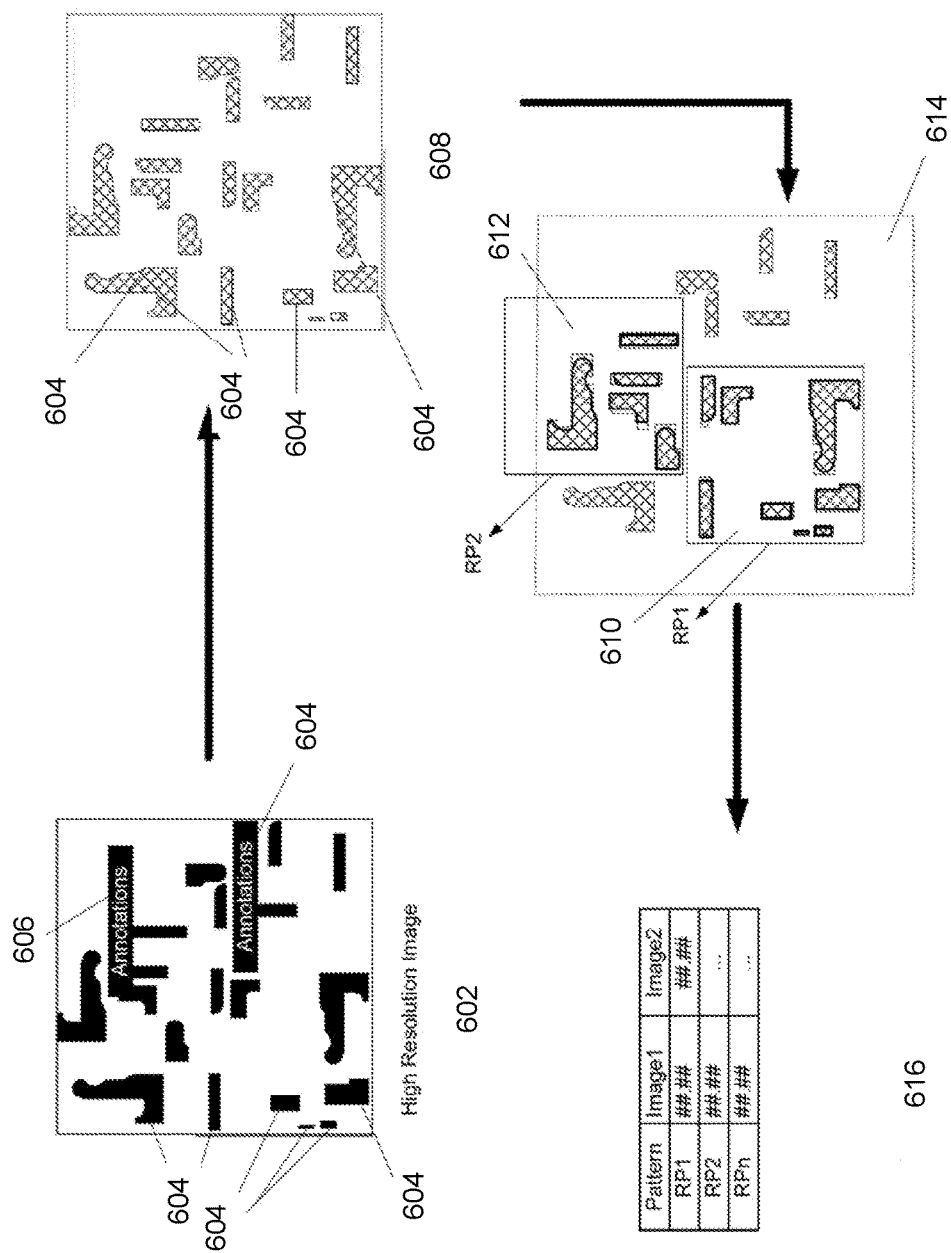
FIG. 6A illustrates an example embodiment of a process of building the Pattern Tracking Database.

FIG. 6A illustrates an example embodiment of a process of building the Pattern Tracking Database. FIG. 6A illustrates a diagram 600 describing the extraction of contours from high resolution images and comparing the extracted contours from the images with reference patterns in a database. In some embodiments, the processing illustrated in FIG. 6A is performed using system 100 of FIG. 1 and process 200 of FIG. 2A and/or process 250 of FIG. 2B.

As illustrated, after an inspection tool provides a location (e.g., coordinates) of a potential defect, a high resolution image 602 (e.g., SEM Image) of the location is obtained. As shown, image 602 comprises features 604 that are at least a part of an electronic circuit, and are represented by lines and/or polygons. Image 602 also includes graphical or textual annotations 606 added by the capturing tool or by any other means. Annotations are commonly present on high resolution images, although in other embodiments no annotations may be present. In one embodiment, image 602 is processed to remove the annotations. Removing annotations reduces or eliminates contour extraction errors, allowing the extracted contours to be properly matched with the reference design contained in the physical layout file. While removing the annotations 606, the background color, pattern, and texture of the high resolution image can be reconstructed.

The high resolution images are processed by extracting the contours of features 604 as illustrated in the resulting image 608. For example, edge detection can be used to extract the contours, as described above. Once contours from features 604 have been extracted from the high-resolution image 602, the contours are "matched" to the original design layout file. Because contours are based on actual images of patterns printed on a wafer surface, and because the process of printing patterns on a wafer surface may be imperfect, the contours suffer from line-edge roughness and corner rounding effects, among other possible 'artifacts.' The process of matching the contours to the original physical layout file therefore entails a comparison of uneven lines and rounded corners (from the extracted contours) to perfectly straight lines and 90-degree (or other angles) corners (from physical layout). Once the contours have been matched to the design in this manner, a clip of the matched section from the physical layout is extracted. This lifted design clip serves as the reference for the contours—that is, an extracted contour should closely resemble its design reference. This lifted design clip can be split or decomposed into a set of patterns. As described above, patterns are generated from the design clip by extracting an area around features of interest, identified, for example, by evaluating the matched section using a rule-based pattern search engine, as described above.

The extracted reference patterns 610 and 612 are then compared against the tracked reference patterns already present in pattern tracking database 508 of FIG. 5 (that includes line and/or polygon shapes that represent features from the physical layout file). In this embodiment, extracted reference patterns 610 and 612 can be determined to be a match with existing tracked Reference Pattern 1 and Reference Pattern 2, respectively. Once it has been determined that lifted design clip 614 contains reference patterns 610 and 612 that match Reference Patterns 1 (RP1) and 2 (RP2) respectively, in one embodiment, a fidelity score (or multiple scores based on different criteria) for each of patterns 610 and 612 is calculated from the extracted contour(s) and added to one or more tables in the pattern tracking database 508 of FIG. 5 as illustrated at 616. As an example, Reference Pattern 1 can have two prior fidelity scores assigned from previous extracted reference patterns generated from analysis of high-resolution images. After image 602 is processed, a third score can be inserted in pattern tracking database 508 of FIG. 5 for the recently calculated fidelity score of pattern 610. Similarly, a fidelity score for pattern 612 can also be calculated and assigned to Reference Pattern 2. By storing the scores in a database the pattern can thus be tracked over time.

Figure 6B:
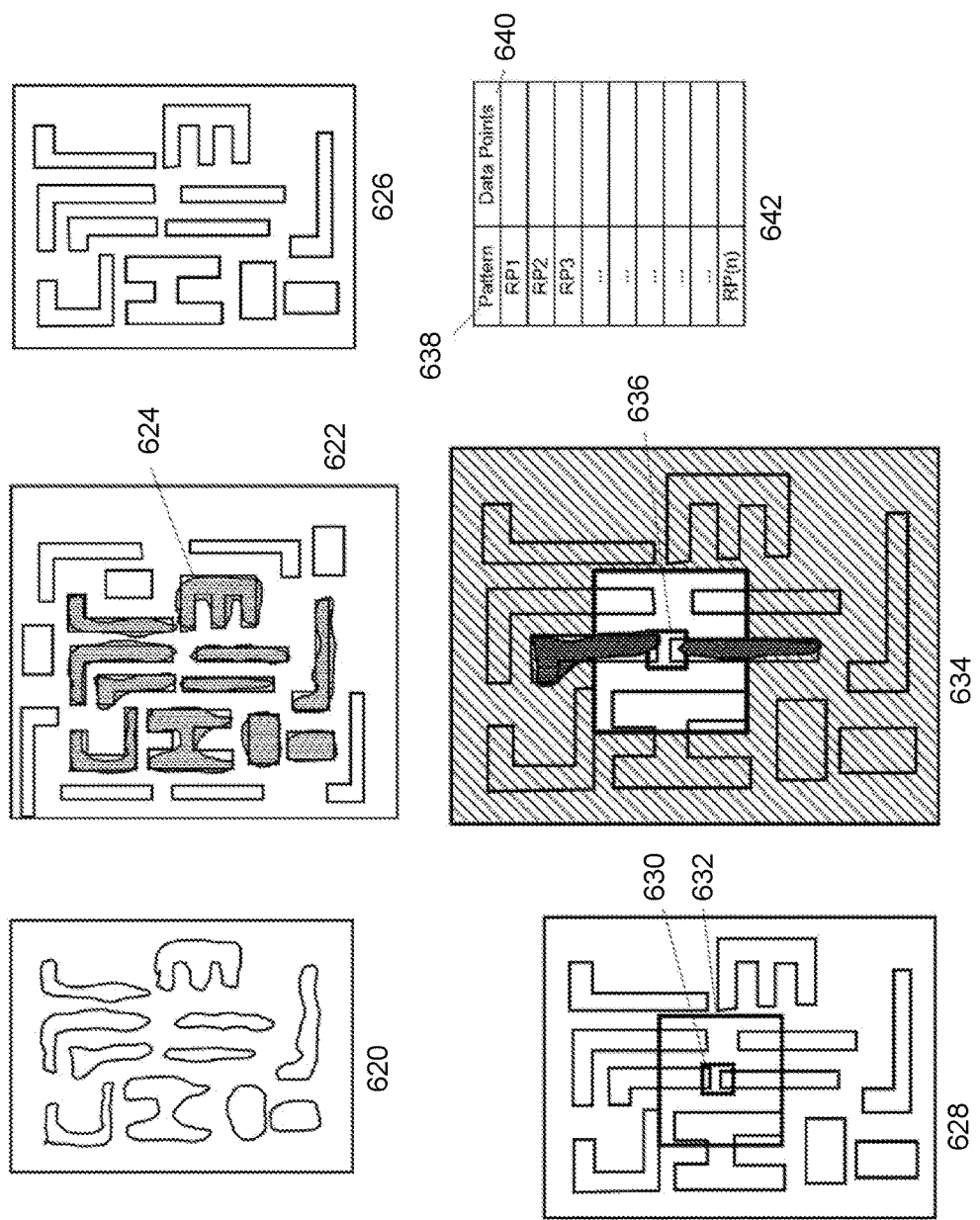
FIG. 6B illustrates another example embodiment of a process of building the Pattern Tracking Database.

FIG. 6B illustrates another example embodiment of a process of building the Pattern Tracking Database. In some embodiments, the processing illustrated in FIG. 6B is performed using system 100 of FIG. 1 and process 200 of FIG. 2A and/or process 250 of FIG. 2B.

As discussed in conjunction with FIG. 6A, if there are annotations on the high-resolution image, they may be removed before proceeding with contour extraction. In the example of FIG. 6B, diagram 620 illustrates an example of extracted contours from a high-resolution image. The contours contain corner rounding and line-edge roughness that is characteristic of actual printed images. The extracted contours of the image are then aligned to the physical layout (the reference design), and is shown in diagram 622. Here, item 624 shows the contours aligned to a specific part of the larger design. This matching area (or aligned area) is then "lifted" as shown in diagram 626. This lifted design clip is the reference or intended design for the extracted contours. The lifted design clip is then searched for the existence of any critical or consequential features through a rule-based search (or pattern matching search). In diagram 628, as an example, a "tip-to-tip" search is performed that identifies a critical feature 630. A surrounding pattern 632 of a given radius is extracted around this feature. The radius can be user specified or a default value can be used or the radius can be dynamically programmed (e.g., a suitable radius can be calculated automatically).

A fidelity score is calculated for the extracted contours within the critical feature 636. In one embodiment, the fidelity score is determined as follows. The location of the feature of interest in the design clip is identified. The corresponding location in the extracted contours of the high resolution image (which has been aligned to the design clip, as shown at 624) is identified. The intended dimensions for the feature of interest are determined by evaluating the location of the feature of interest in the design clip. The printed dimensions of the same feature of interest are measured by evaluating the contours of the feature of interest at the corresponding location in the extracted contours. While contours of an entire image are extracted and aligned to a reference design, measurements are performed only within a feature of interest. For example, only the portion of the reference design and the extracted contour that intersects (or lies within) a boundary or region (e.g., box) that delineates the feature of interest is compared. A variance between the measured dimensions of the feature of interest as fabricated and the intended dimensions of the feature of interest is calculated. A fidelity score can also be calculated using the raw measurement data (measured from the contours of the feature of interest) and the intended dimensions of the feature of interest. At 634, the contours for the feature as printed and the intended design of the feature are superimposed and overlaid for illustrative purposes.

The extracted reference pattern 632 (extracted from design clip 626) is then compared with existing reference patterns 638 already present (i.e., already being tracked) in the Pattern Tracking Database 642. If the extracted reference pattern 632 extracted from the design clip does not exist in the Pattern Tracking Database 642, the extracted reference pattern is added to the Pattern Tracking Database as a new reference pattern to be tracked. However, if the extracted reference pattern 632 already exists in the Pattern Tracking Database (e.g., matches to an existing reference pattern in the database), then the newly calculated fidelity score is added as a new Data Point 640 for the existing reference pattern.

FIG. 7 illustrates a diagram describing an example embodiment of a comparison of the contours extracted from an image to their corresponding design to deduce the fidelity score of the contours. Fidelity scores can be calculated using any metric, as appropriate. In some embodiments, the processing illustrated in FIG. 7 is performed using system 100 of FIG. 1 and process 200 of FIG. 2A and/or process 250 of FIG. 2B.

In one embodiment, analysis and overlay of the extracted contours and the matching section of the reference design facilitates determining the exact location of a defect on the image. By matching the extracted contours to the physical layout (i.e. aligning the contours to the design) and calculating which part of the contours contain the defect, the exact polygon(s) in the physical layout that were impacted by the manufacturing defect can be determined. This precise information can provide new yield enhancement opportunities that benefit from knowing the precise location of a defect on the physical layout.

As illustrated in FIG. 7, in one embodiment, image A and image B correspond to the same portion or design clip 700 of the reference design (e.g., based on performing contour-to-design alignment, as described above). The contours of images A and B (e.g., extracted using contour extraction, as described above) can be overlaid and compared to the design clip. As can be seen from contours of image A and image B, there is an anomaly in both contours when overlaid and compared to the features of the design clip (where the features are identified, for example, using a rule-based feature search as described above). Specifically, contours of the printed features 704A and 706A can be seen as imperfect representations of features 704 and 706 of the design clip, respectively. Similarly, features 704, 706, 708, and 710 of the design clip are imperfectly represented by 704B, 706B, 708B, and 710B of contour B, respectively.

In one embodiment, any critical feature (e.g., lines with small widths or small spacing between lines) can be examined and assigned a fidelity score. For example, if the features (e.g., 702 and 704), when printed on the wafer, have a significantly smaller spacing (due, for example, to a modification/revision in the fabrication process) than intended in the physical layout file, then these patterns can appear as a continuous mass without the requisite line spacing or line width (in other words, features 702 and 704 can appear as a single polygon shape). Thus, in such a case, overlaying the design clip with the extracted contours of an actual image can show that erroneous patterns were fabricated onto the wafer, and thereby identify an anomaly of a critical feature. For these critical features, a variance between the extracted contours of a feature and its intended design can be determined and used to calculate and assign a fidelity score. In another embodiment, the fidelity score can be calculated using any geometric property of the feature, as appropriate. In one embodiment, the fidelity score is a metric and determines the printability and stability of a given pattern in a given chip design layout surrounding the feature.

Based on such comparison of extracted contours of features to their intended design, an empirical computation of a fidelity score for each reference pattern matching to a pattern extracted from a design clip around a feature can be performed by analyzing variations between the reference and the actual, which can be used to determine how closely or poorly the printed pattern matches the intended reference pattern. In this way, weak and strong chip design patterns can be efficiently determined for a specific physical layout.

Figure 8:
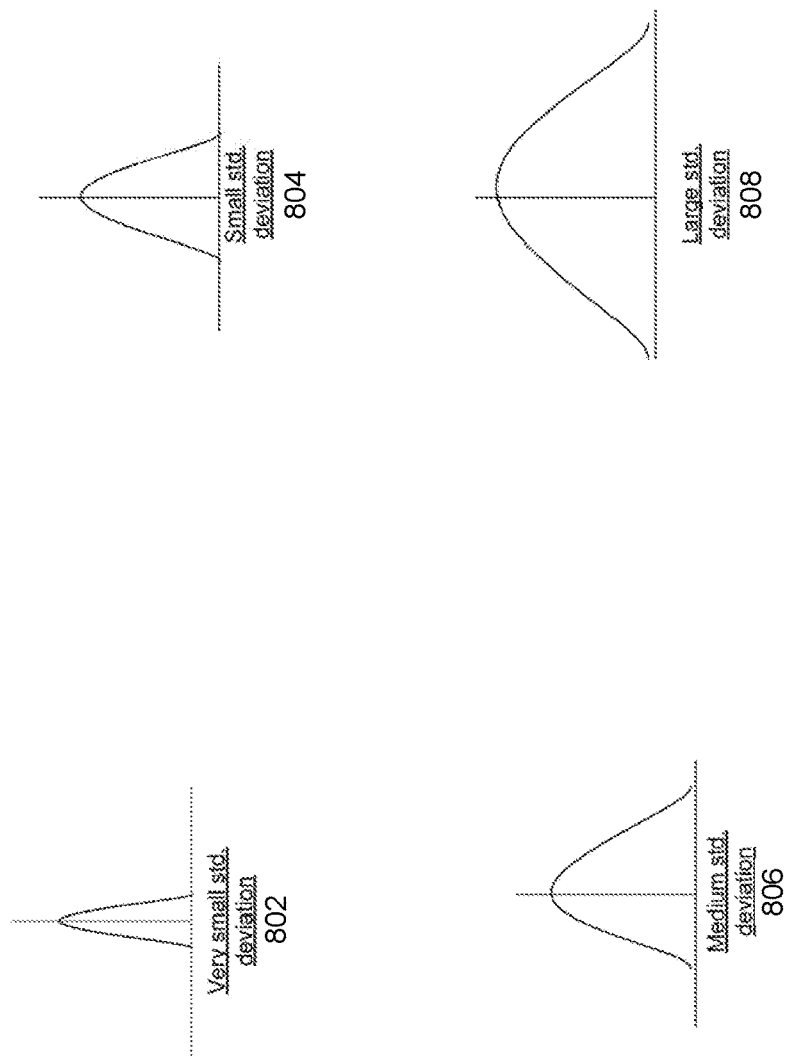
FIG. 8 illustrates four sample frequency diagrams of fidelity scores of four patterns.

FIG. 8 illustrates four sample frequency diagrams of fidelity scores of four reference patterns tracked in the pattern tracking database. In some embodiments, the frequency diagrams are generated using feature analysis engine 120 of system 100 of FIG. 1, and can be provided as output, for example, using query/reporting engine 122.

The diagrams (which can be any appropriate type of plot such as a scatter plot, a box plot, a frequency history, etc.) show the spread of fidelity scores, where some patterns have a narrower spread (small standard deviation) and others have a wider spread (larger standard deviation), according to one embodiment of the present invention. A small standard deviation indicates a stronger pattern, one that tends to print consistently. A large standard deviation indicates a weaker pattern, one that tends to print more erratically.

In one embodiment, by plotting the standard deviation of a metric, the strength or weakness of the pattern, based on that metric, can be determined. As illustrated in FIG. 8, a graph of a very small standard deviation 802 signifies a strong pattern. A smaller standard deviation indicates a greater stability or repeatability of a reference pattern on a semiconductor device. This means that the printed or etched pattern on the wafer (represented by the high resolution image) did not deviate much from its reference pattern. A small standard deviation of a metric (as shown in 804) would signify that the etched pattern on the wafer deviates a little more from its reference pattern than the previous case of a very small standard deviation. Thus, in this case, the reference pattern will be less strong than that of standard deviation 802. Medium standard deviation 806 would similarly signify a pattern that is weaker than the first two cases, and a large standard deviation 808 would signify the weakest pattern.

FIG. 9 illustrates an example embodiment of a table (900) describing some of the statistical summary data of each reference pattern. In some embodiments, the statistical summary is generated using further analysis engine 120 of system 100 of FIG. 1, and can be provided as output, for example, using query/reporting engine 122.

This data can be used to quickly state the strength or weakness of a pattern, according to one embodiment of the present invention. In one embodiment, for each reference pattern, an overall metric score can be computed and stored along with its standard deviation and frequency of occurrence of the pattern, and any additional metrics. In addition to a summary data analysis table containing summary or overall statistics calculated for those reference patterns, in some embodiments, the pattern tracking database includes an empirical raw data table(s) containing the more exhaustive raw data for the empirical data points associated with a reference pattern. In various embodiments, this raw data includes, but is not limited to, such items as the Lot ID, Wafer ID, Die ID, die coordinate, the contour itself, the fidelity score(s) for each empirical data point, the Date/Time of the inspection step that identified the defect whose high resolution image was taken (from which the empirical data was obtained), etc. In some embodiments, the summary data analysis table includes a reference to the empirical raw data table(s).

In one embodiment, the standard deviation of at least one set of empirical data can be calculated and stored in a summary data analysis database table 900. Such a table can be queried to determine weak patterns (having medium or large standard deviation 806 or 808, respectively). Such weak patterns can be provided as an input to inspection tools including, but not limited to, Bright Field inspection tools, Dark Field inspection tools, E-Beam inspection tools, etc., and the patterns can be monitored on all lots during the fabrication process. Such weak patterns can also be provided to imaging tools such as, but not limited to, SEM Defect Review tools in order to capture images of those locations on a periodic or non-periodic basis.

In another embodiment, table 900 can also provide comprehensive assessment of the impact of a photomask revision or a process revision. This can be determined because the empirical data can be calculated, monitored, and tracked after each process revision or photomask revision, and subsequently compared with data that was collected and stored prior to the modification. Such comparisons can be useful to determine which patterns became stronger (or weaker) and at which locations, and which patterns remained the same after the photomask or process revision. When the impact to a broad set of patterns is assessed in this manner, it helps to determine whether the mask or process revision imparted a net positive impact (and the extent of that impact), a net negative impact (and the extent of that impact), or zero impact.

Patterns that are deemed weak or strong can be compared against a semiconductor device's photolithography simulation (e.g., Optical Proximity Correction (OPC), Optical Rule Check (ORC)) during the fabrication process to assess the accuracy of those simulation models. If the patterns have a small standard deviation, it can be further determined if any one of those patterns were flagged as weak points by the OPC or ORC simulation. As patterns with small standard deviation are considered to be strong patterns and no (or very minor) errors are expected, they should not be flagged by the photolithography simulation. But if they are, it would indicate the need to modify or recalibrate the photolithography simulation. Similarly, patterns with a medium or large standard deviation are expected to be weak patterns. Thus, if an empirically observed weak pattern was not flagged by the photolithography simulation, it would also indicate the need to modify or recalibrate the photolithography simulation. Further, as OPC/ORC simulation models can either over-predict or under-predict weak patterns, a comparison with actual empirical data provides a better and more stable feedback loop resulting in a better simulation model and hence an improved photomask or physical layout. Furthermore, knowledge of the locations of weak patterns and potential weak patterns can be used to direct inspection, metrology, and imaging tools to those locations.

Figure 10A:
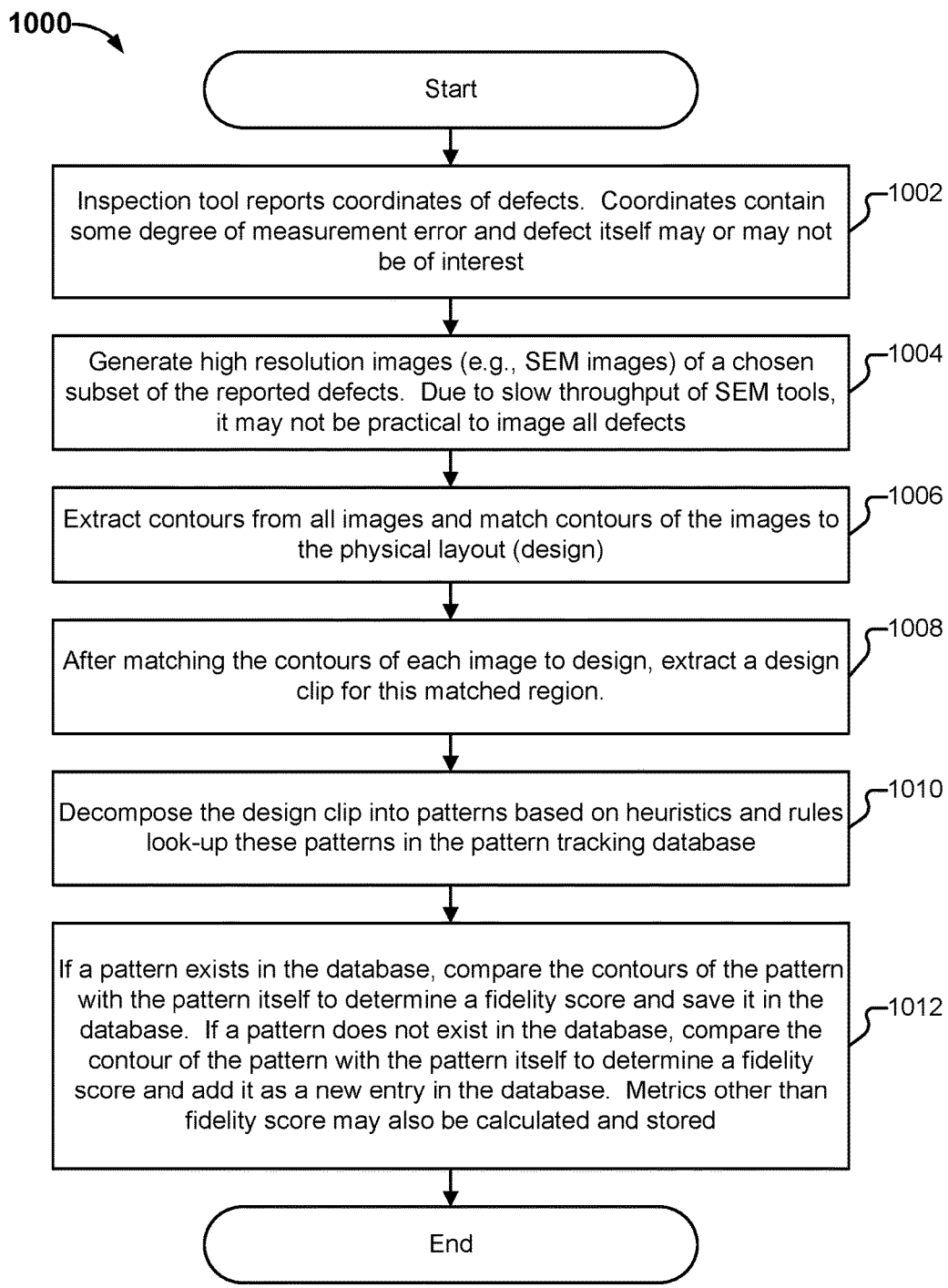
FIG. 10A is a flow diagram illustrating an embodiment of a process for extracting contours from high resolution images, aligning them to a physical layout, and splitting the resulting pattern into smaller sub-patterns for tracking a pattern tracking database.

FIG. 10A is a flow diagram illustrating an embodiment of a process for extracting contours from high resolution images, aligning the contours to a matching section of a physical layout, and splitting the matching pattern into smaller sub-patterns for tracking in a pattern tracking database. In some embodiments, process 1000 is executed by one or more inspection/imaging tools and system 100 of FIG. 1. In some embodiments, process 1000 is an alternate embodiment of processes 200 and 250 of FIGS. 2A and 2B, respectively.

At 1002, during the fabrication process of a semiconductor device, an inspection tool reports the coordinates of defects on a wafer. The coordinates may include some degree of measurement error, and a defect itself may or may not be of interest. At 1004, high resolution images (e.g., SEM images) of a chosen subset of the reported defects are generated (e.g., by SEM imaging tool). In some embodiments, due to the relatively slow throughput of SEM tools, it may not be practical to image all defects.

At 1006, contours are extracted from all images, and the extracted contours for the images are matched to the physical layout or physical design of the semiconductor device. At 1008, after matching the contours of each of the images to the physical design, a design clip is extracted for a matched region. The extracted design clip is also referred to herein as "lifted design clip" or "lifted section." The lifted design clip refers to the portion of the physical layout pattern that matches the extracted contour.

At 1010, the lifted design clip is decomposed into patterns as extracted reference patterns based on various heuristics or various rules. For example, a rule-based pattern search for features of interests and extraction of patterns around the features of interest can be used, as described above. The identified and extracted reference patterns are looked up in a pattern tracking database. At 1012, if an extracted reference pattern exists in the database, the contours of the portion of the image corresponding to the extracted reference pattern are compared with the extracted reference pattern itself to determine a fidelity score and the fidelity score is saved in the database in a row associated with the existing reference pattern matching the extracted reference pattern. If an extracted reference pattern does not exist in the database, the contours of the portion of the image corresponding to the extracted reference pattern is compared with the extracted reference pattern as defined by the reference design to determine a fidelity score, and the fidelity score is added as a new entry in the database. Metrics other than fidelity scores can also be calculated and stored, as described above. In some embodiments, comparing the contours of the portion of the image corresponding to an extracted reference pattern with the extracted reference pattern itself includes comparing, as described above, the contours of the portion of the image corresponding to the feature around which the extracted reference pattern was extracted against how the feature was intended to be fabricated (according to the reference design or layout).

Figure 10B:
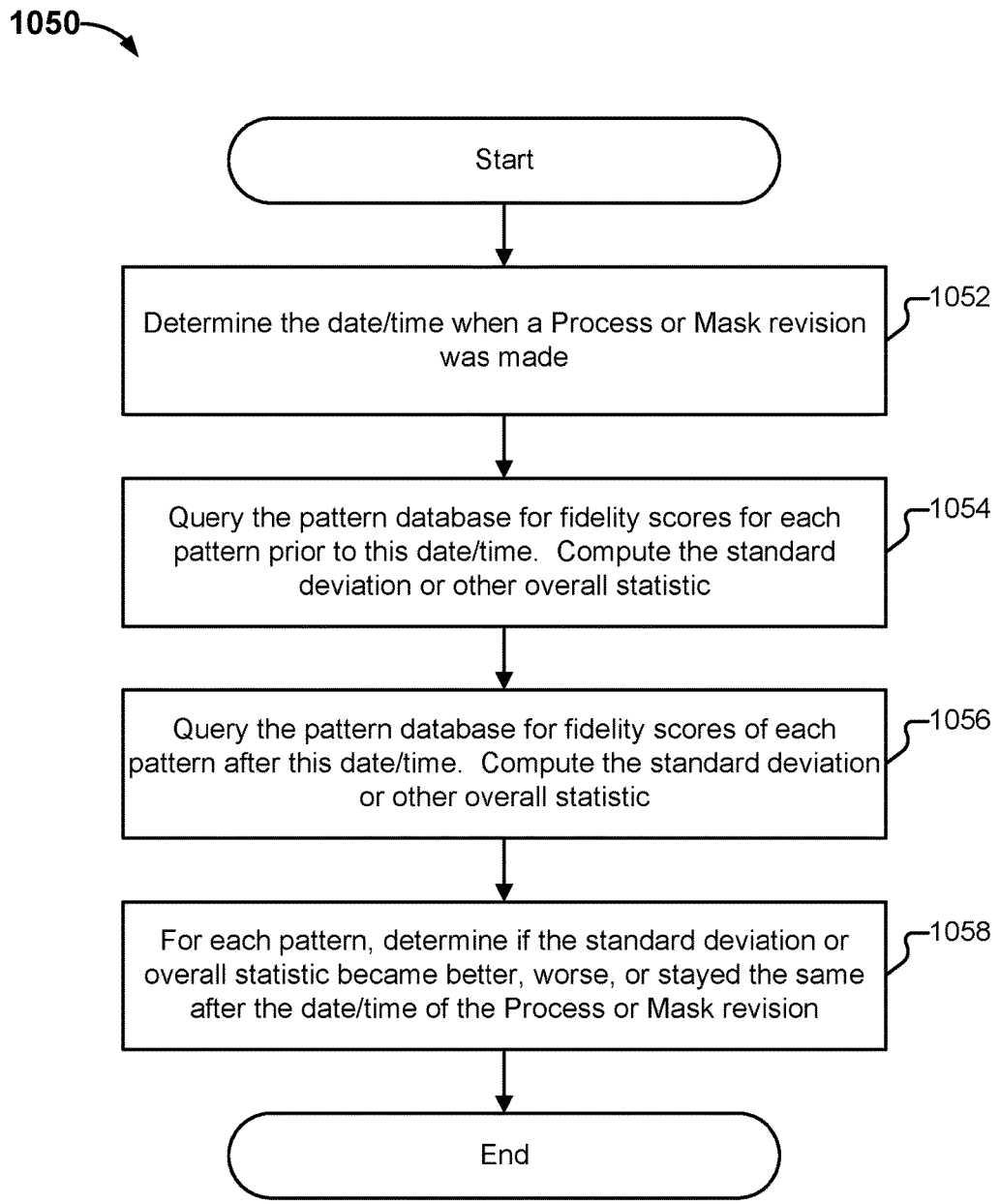
FIG. 10B is a flow diagram illustrating an embodiment of a process for assessing the impact of a photomask revision or process revision on the fidelity or quality of the printed pattern.

FIG. 10B is a flow diagram illustrating an embodiment of a process for assessing the impact of a photomask revision or process revision on the fidelity or quality of the printed pattern. In some embodiments, process 1050 is executed by system 100 of FIG. 1. Defects in a semiconductor device can arise due to numerous factors. Such factors include photomask/OPC/ORC issues and process condition issues. Defects arising from photomask issues are typically associated with imperfections in OPC/ORC, while defects arising from process condition issues broadly include over-etching, under-etching, time or material constraints, ineffective chemicals, ineffective process tool recipes, process equipment issues, and/or other issues. It is often desirable to assess the impact of photomask revisions or process condition revisions on the fidelity or quality of the printed patterns, and to attribute a weak pattern or set of weak patterns to a specific photomask or process condition revision. As illustrated in FIG. 10B, this can be done by comparing the pattern fidelity data before and after a photomask or process change to determine whether patterns became weaker, stronger, or remained the same after the change was made.

The process begins at 1052, where the date/time when a process or mask revision was made is determined. At 1054, the pattern tracking database is queried for fidelity scores for each pattern prior to the determined date/time. The standard deviation or other overall statistics are computed. At 1056, the pattern tracking database is queried for fidelity scores of each pattern after the determined date/time. The standard deviation or other overall statistics are computed. At 1058, for each pattern, it is determined if the standard deviation or overall statistic has become better, worse, or stayed the same after the date/time of the process or mask revision. In various embodiments, process 1050 can be adapted to perform a comparison of patterns before and after any other type of change.

Figure 11A:
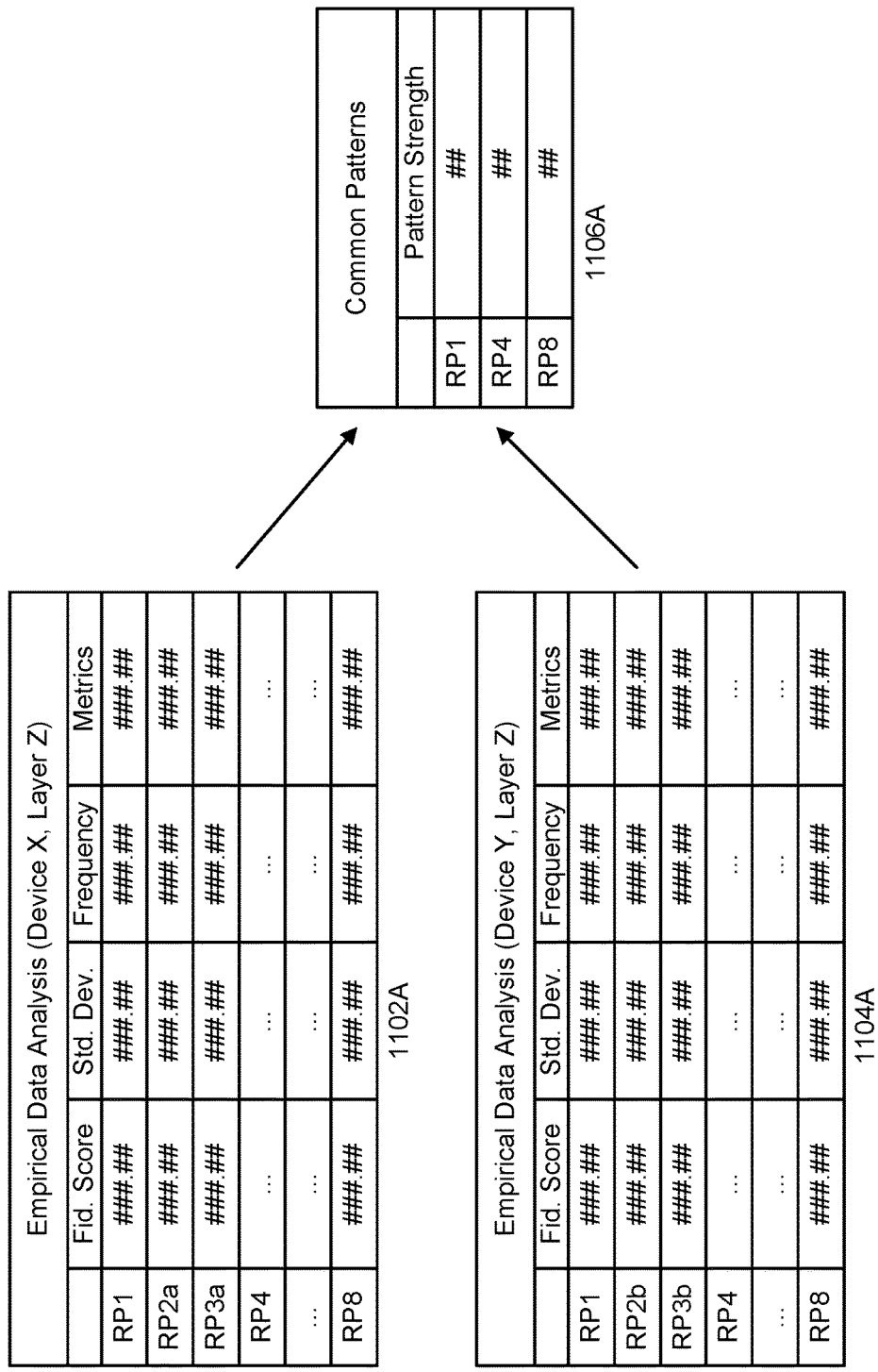
FIG. 11A illustrates example embodiments of tables in a pattern tracking database.

FIG. 11A illustrates example embodiments of tables in a pattern tracking database. Table 1106A includes empirical data relating to common patterns between different devices. As illustrated, tables 1102A and 1104A include empirical data for Layer Z of devices X and Y. More specifically, table 1102A includes reference patterns and empirical data related to device X, Layer Z, providing overall metric score, standard deviation, frequency of the pattern within device X, etc. Table 1104A includes reference patterns and empirical data related to device Y, Layer Z, providing overall metric score, standard deviation, frequency of pattern within device Y, etc. Table 1106A provides patterns that are common to both Device X and Device Y as determined by comparing the reference patterns contained in tables 1102A and 1104A. In this way the overall strength or weakness of patterns held in common between two or more devices can be evaluated, and discrepancies studied.

Figure 11B:
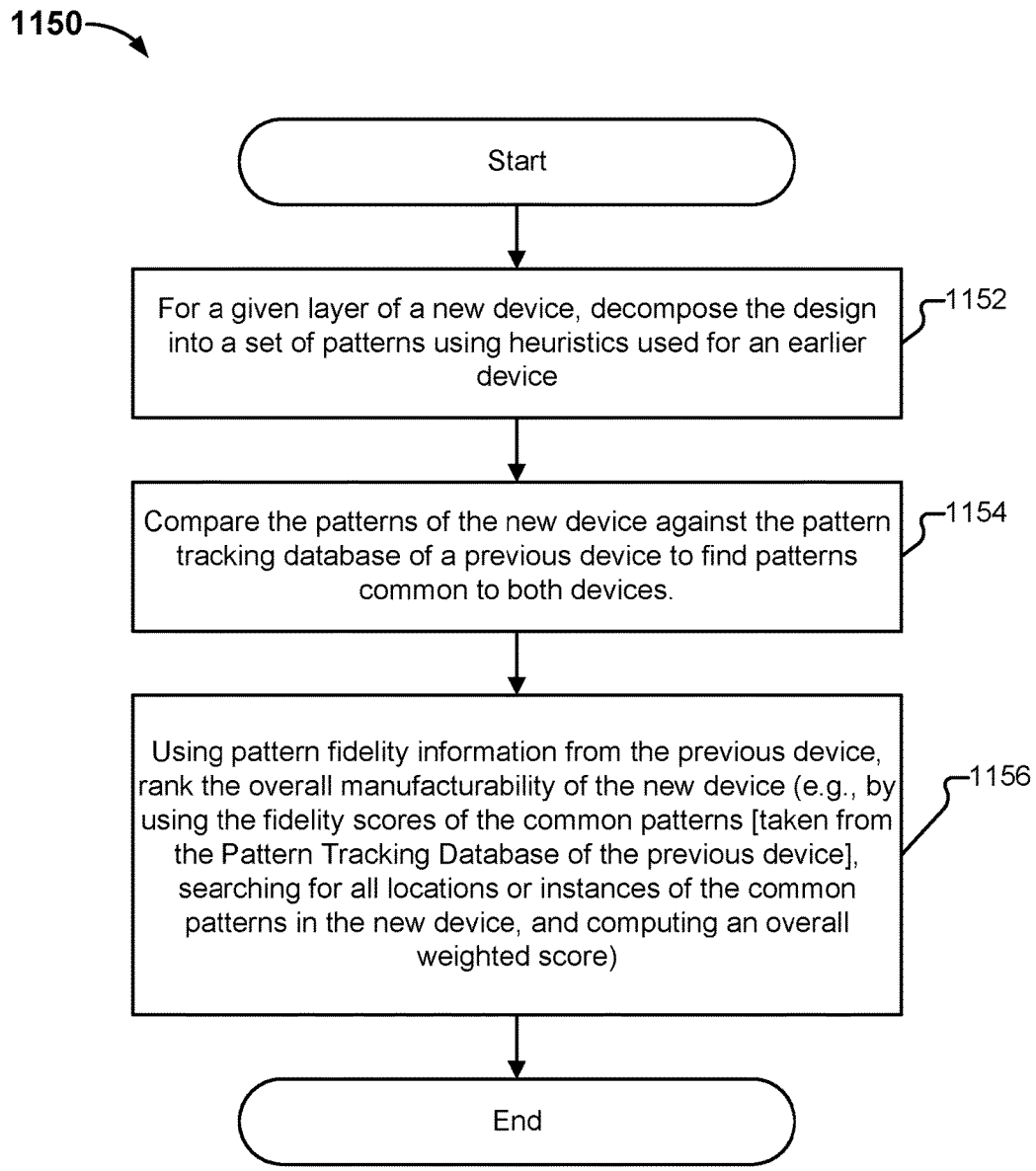
FIG. 11B is a flow diagram illustrating an embodiment of a process for ranking the overall manufacturability of a new device by using the pattern fidelity information from a previous device.

FIG. 11B is a flow diagram illustrating an embodiment of a process for ranking the overall manufacturability of a new semiconductor device by using the pattern fidelity information from a previous device. In some embodiments, process 1150 is executed by system 100 of FIG. 1. The process begins at 1152, where, for a given layer of a new device, the physical design of the semiconductor device is decomposed into a set of patterns using heuristics (e.g., rule-based pattern search, as described above), similar to those used to decompose an earlier device. At 1154, the patterns of the new device are compared against the pattern tracking database of a previous device to find patterns common to both devices. At 1156, using pattern fidelity information from the previous device, the overall manufacturability of the new device is ranked. This can be done, for example, by using the fidelity scores of the common patterns (taken from the pattern tracking database of the previous), searching for all locations of instances of the common patterns in the new device, and computing an overall weighted (fidelity) score.

Figure 12:
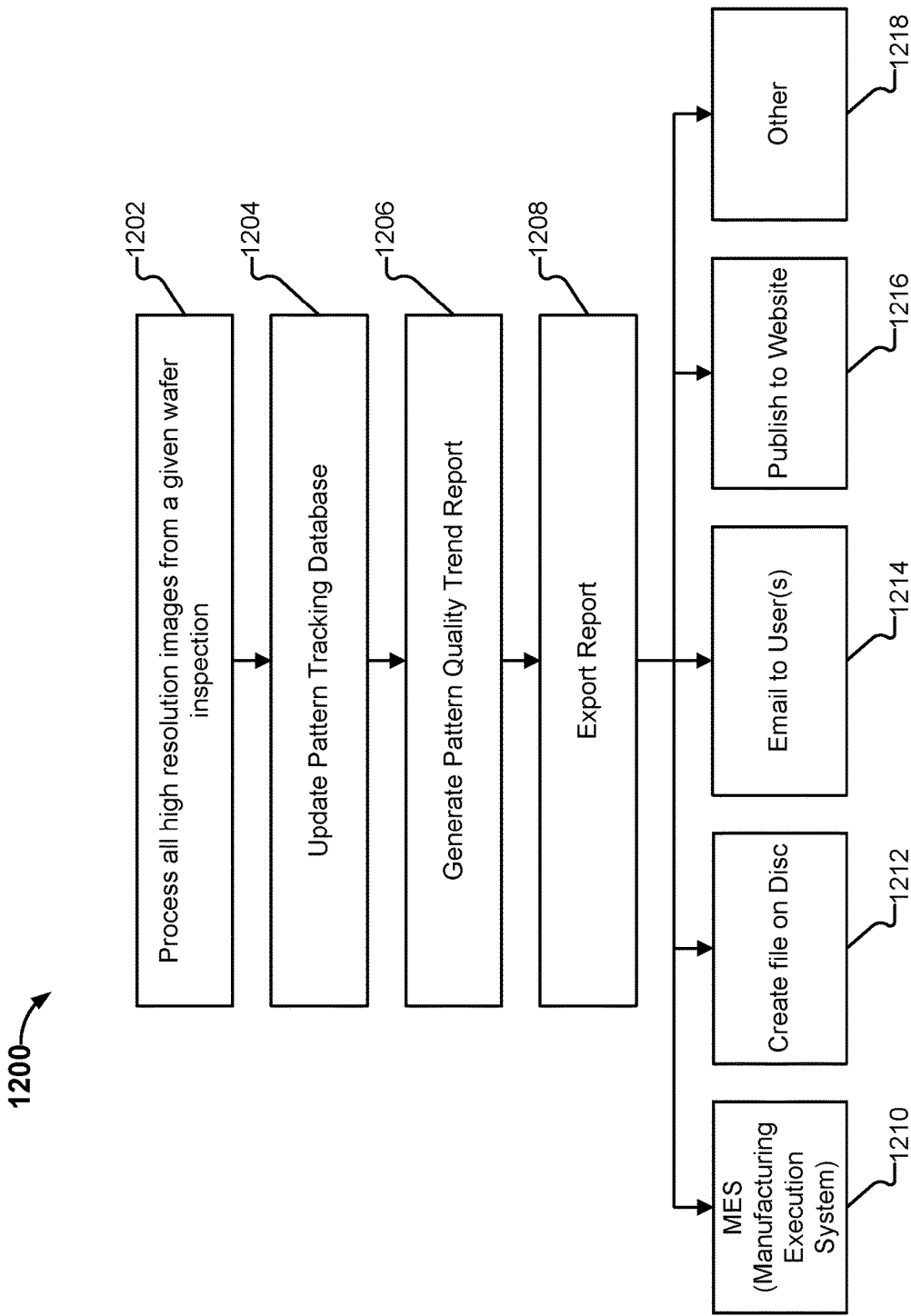
FIG. 12 is a flow diagram illustrating an embodiment of a process for delivering automatic and inline reports of pattern quality trends and issues.

FIG. 12 is a flow diagram illustrating an embodiment of a process for delivering automatic and inline reports of pattern quality trends and issues. In some embodiments, process 1200 is executed by system 100 of FIG. 1. In one embodiment, these reports provide timely assessment of patterning issues that can be used to take corrective action quickly. As each set of high resolution images for an inspected wafer is processed at 1202, the results are added to the Pattern Tracking Database at 1204. In some embodiments, process steps 1202 and 1204 are implemented using process 200 of FIG. 2A and/or process 250 of FIG. 2B. Using both the current pattern fidelity scores and historical pattern fidelity scores in the database, a Pattern Quality Trend Report is generated at 1206. In another embodiment, the report generated at 1206 is exported in a manner where appropriate personnel are notified in order to take follow-up action, as shown at 1208. In yet another embodiment, one of the export options can be to send key elements of the report to the fab's Manufacturing Execution System or MES (1210), which manages the flow of material through the fabrication plant. This can put a 'lot' or process step on hold, for example, or notify appropriate personnel. In yet another embodiment, the report is generated as a file 1212 and exported to a folder on a local or network drive. In one embodiment, the report can be emailed to a set of user(s) as shown at 1214. In one embodiment, the report can be published to a website, as shown at 1216. Similarly, other notification options 1218 can also be added, as appropriate.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    one or more processors configured to:
        receive a reference design comprising a physical layout file of a semiconductor device;
        identify features of interest in the received reference design, wherein a feature of interest comprises a representation of a portion of the semiconductor device to be monitored;
        for each identified feature of interest, extract, from the received reference design, a pattern within a particular radius of the identified feature of interest;
        determine a set of distinct reference patterns at least in part by evaluating the patterns extracted from the received reference design;
        include the set of distinct reference patterns, determined from the received reference design, in a pattern tracking database; and
        track a reference pattern in the pattern tracking database at least in part by updating the reference pattern with empirical information associated with a printed pattern determined to match to the reference pattern; and
    a memory coupled to the one or more processors and configured to provide the one or more processors with instructions.

2. The system of claim 1 wherein determining the set of distinct reference patterns includes grouping the patterns extracted from the reference design, wherein each grouping corresponds to a distinct reference pattern.

3. The system of claim 2 wherein extracted patterns determined to match based at least in part on their geometries are grouped together.

4. The system of claim 1 wherein the printed pattern is determined at least in part by processing an image of at least a portion of a semiconductor wafer.

5. The system of claim 1 wherein the empirical information comprises raw measurement data associated with the printed pattern.

6. The system of claim 1 wherein the empirical information comprises a fidelity score, wherein the fidelity score is indicative of how the printed pattern matches to its intended design.

7. The system of claim 1 wherein the one or more processors are further configured to detect, based at least in part on the empirical information, an occurrence of a defect.

8. The system of claim 7 wherein the one or more processors are further configured to classify the detected defect according to a defect type.

9. The system of claim 1 wherein the one or more processors are further configured to determine a measure of strength or weakness of the reference pattern based at least in part on a measure of deviation of printed patterns from the reference pattern.

10. The system of claim 1 wherein the one or more processors are further configured to:
    identify two features of interest in two different portions of the received reference design, wherein the two features of interest are the same or similar feature of interest;
    extract, from the received reference design, two reference patterns surrounding the two same or similar features of interest identified in the two different portions of the received reference design; and
    determine that the extracted two reference patterns surrounding the identified two same or similar features of interest are different reference patterns.

11. A method, comprising:
    receiving a reference design comprising a physical layout file of a semiconductor device;
    identifying, using one or more processors, features of interest in the received reference design, wherein a feature of interest comprises a representation of a portion of the semiconductor device to be monitored;
    for each identified feature of interest, extracting, from the received reference design, a pattern within a particular radius of the identified feature of interest;
    determining a set of distinct reference patterns at least in part by evaluating the patterns extracted from the received reference design;
    including the set of distinct reference patterns, determined from the received reference design, in a pattern tracking database; and
    tracking a reference pattern in the pattern tracking database at least in part by updating the reference pattern with empirical information associated with a printed pattern determined to match to the reference pattern.

12. The method of claim 11 wherein determining the set of distinct reference patterns includes grouping the patterns extracted from the reference design, wherein each grouping corresponds to a distinct reference pattern.

13. The method of claim 12 wherein extracted patterns determined to match based at least in part on their geometries are grouped together.

14. The method of claim 11 wherein the printed pattern is determined at least in part by processing an image of at least a portion of a semiconductor wafer.

15. The method of claim 11 wherein the empirical information comprises raw measurement data associated with the printed pattern.

16. The method of claim 11 wherein the empirical information comprises a fidelity score, wherein the fidelity score is indicative of how the printed pattern matches to its intended design.

17. The method of claim 11 further comprising detecting, based at least in part on the empirical information, an occurrence of a defect.

18. The method of claim 17 further comprising classifying the detected defect according to a defect type.

19. The method of claim 11 further comprising determining a measure of strength or weakness of the reference pattern based at least in part on a measure of deviation of printed patterns from the reference pattern.

20. The method of claim 11 further comprising:
    identifying two features of interest in two different portions of the received reference design, wherein the two features of interest are the same or similar feature of interest;
    extracting, from the received reference design, two reference patterns surrounding the two same or similar features of interest identified in the two different portions of the received reference design; and determining that the extracted two reference patterns surrounding the identified two same or similar features of interest are different reference patterns.

21. A computer program product embodied in a non-transitory computer readable storage medium and comprising computer instructions for:
   receiving a reference design comprising a physical layout file of a semiconductor device;
   identifying features of interest in the received reference design, wherein a feature of interest comprises a representation of a portion of the semiconductor device to be monitored;
   for each identified feature of interest, extracting, from the received reference design, a pattern within a particular radius of the identified feature of interest;
   determining a set of distinct reference patterns at least in part by evaluating the patterns extracted from the received reference design;
   including the set of distinct reference patterns, determined from the received reference design, in a pattern tracking database; and
   tracking a reference pattern in the pattern tracking database at least in part by updating the reference pattern with empirical information associated with a printed pattern determined to match to the reference pattern.

22. The computer program product of claim 21 wherein determining the set of distinct reference patterns includes grouping the patterns extracted from the reference design, wherein each grouping corresponds to a distinct reference pattern.

23. The computer program product of claim 22 wherein extracted patterns determined to match based at least in part on their geometries are grouped together.

24. The computer program product of claim 21 wherein the printed pattern is determined at least in part by processing an image of at least a portion of a semiconductor wafer.

25. The computer program product of claim 21 wherein the empirical information comprises raw measurement data associated with the printed pattern.

26. The computer program product of claim 21 wherein the empirical information comprises a fidelity score, wherein the fidelity score is indicative of how the printed pattern matches to its intended design.

27. The computer program product of claim 21 further comprising computer instructions for detecting, based at least in part on the empirical information, an occurrence of a defect.

28. The computer program product of claim 27 further comprising computer instructions for classifying the detected defect according to a defect type.

29. The computer program product of claim 21 further comprising computer instructions for determining a measure of strength or weakness of the reference pattern based at least in part on a measure of deviation of printed patterns from the reference pattern.

30. The computer program product of claim 21 further comprising computer instructions for:
   identifying two features of interest in two different portions of the received reference design, wherein the two features of interest are the same or similar feature of interest;
   extracting, from the received reference design, two reference patterns surrounding the two same or similar features of interest identified in the two different portions of the received reference design; and
   determining that the extracted two reference patterns surrounding the identified two same or similar features of interest are different reference patterns.

* * * * *